US012560538B2

(12) United States Patent
Yasuhiko et al.

(10) Patent No.: US 12,560,538 B2
(45) Date of Patent: Feb. 24, 2026

(54) OBSERVATION DEVICE AND OBSERVATION METHOD

(71) Applicant: HAMAMATSU PHOTONICS K.K., Hamamatsu (JP)

(72) Inventors: Osamu Yasuhiko, Hamamatsu (JP); Kozo Takeuchi, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 232 days.

(21) Appl. No.: 18/024,996

(22) PCT Filed: Jan. 21, 2021

(86) PCT No.: PCT/JP2021/002099
§ 371 (c)(1),
(2) Date: Mar. 7, 2023

(87) PCT Pub. No.: WO2022/054305
PCT Pub. Date: Mar. 17, 2022

(65) Prior Publication Data
US 2023/0324296 A1 Oct. 12, 2023

(30) Foreign Application Priority Data
Sep. 11, 2020 (JP) ................................. 2020-153252

(51) Int. Cl.
*G01N 21/45* (2006.01)
*G01N 21/47* (2006.01)
(Continued)

(52) U.S. Cl.
CPC ......... *G01N 21/45* (2013.01); *G01N 21/4795* (2013.01); *G01N 21/8851* (2013.01);
(Continued)

(58) Field of Classification Search
CPC ............... G01N 21/45; G01N 21/4795; G01N 21/8851; G01N 2021/1787;
(Continued)

(56) References Cited

U.S. PATENT DOCUMENTS 9,372,331 B2 * 6/2016 Yamauchi .......... G01N 21/6458
2009/0125242 A1 * 5/2009 Choi ...................... G01N 21/51
702/19
(Continued)

FOREIGN PATENT DOCUMENTS

CN 109580457 A 4/2019
JP 2017-219826 A 12/2017
(Continued)

OTHER PUBLICATIONS

Kang, Sungsam et al., "Imaging deep within a scattering medium using collective accumulation of single-scattered waves," Nature Photonics, vol. 9, 2015, pp. 253-258.
(Continued)

*Primary Examiner* — Isiaka O Akanbi
(74) *Attorney, Agent, or Firm* — Faegre Drinker Biddle & Reath LLP

(57) ABSTRACT

An observation apparatus includes a light source, a mirror, a condenser lens, an objective lens, a beam splitter, an imaging unit, and an analysis unit. The analysis unit includes an interference intensity image acquisition unit, a first complex amplitude image generation unit, a second complex amplitude image generation unit, a two-dimensional phase image generation unit, a three-dimensional phase image generation unit, and a refractive index distribution calculation unit. The analysis unit irradiates an observation object with light along each of a plurality of light irradiation directions, acquires an interference intensity image at a reference position for each of the plurality of light irradia-
(Continued)

tion directions from the imaging unit, and performs necessary processing based on the interference intensity images to obtain a three-dimensional refractive index distribution of the observation object.

8 Claims, 32 Drawing Sheets

(51) Int. Cl.

| | | |
|---|---|---|
| *G01N 21/88* | (2006.01) | |
| *G01N 21/17* | (2006.01) | |
| *G01N 21/41* | (2006.01) | |

(52) U.S. Cl.
CPC ................ *G01N 2021/1787* (2013.01); *G01N 2021/4173* (2013.01); *G01N 2021/458* (2013.01); *G01N 2021/8887* (2013.01); *G01N 2201/127* (2013.01)

(58) Field of Classification Search
CPC ..... G01N 2021/4173; G01N 2021/458; G01N 2021/8887; G01N 2201/127; G01N 21/47; G01N 2021/4186; G02B 21/14; G02B 21/367; G02B 21/361
USPC ......................................... 356/517, 458, 493
See application file for complete search history.

(56) References Cited

U.S. PATENT DOCUMENTS

| | | | | |
|---|---|---|---|---|
| 2009/0237501 A1* | 9/2009 | Lemmer | ............ | G02B 21/0076 348/79 |
| 2012/0307035 A1* | 12/2012 | Yaqoob | ............. | G01B 9/02084 348/79 |
| 2015/0198795 A1* | 7/2015 | Yamauchi | .......... | G01N 21/6458 359/385 |
| 2016/0061725 A1 | 3/2016 | Choi et al. | | |
| 2016/0320485 A1* | 11/2016 | Cheng | .................. | G03H 1/0866 |
| 2017/0105618 A1 | 4/2017 | Schmoll et al. | | |
| 2017/0199495 A1* | 7/2017 | Matsubara | ............. | G03H 1/265 |
| 2017/0299371 A1 | 10/2017 | Cotte et al. | | |
| 2017/0356735 A1* | 12/2017 | Yamauchi | .......... | G01B 9/02049 |
| 2018/0293716 A1 | 10/2018 | Choi et al. | | |
| 2019/0250392 A1* | 8/2019 | Cuche | .................... | G01B 9/021 |
| 2020/0264559 A1* | 8/2020 | Sato | ........................ | G02B 21/06 |

FOREIGN PATENT DOCUMENTS

| | | | | | |
|---|---|---|---|---|---|
| JP | 2019124679 A | * | 7/2019 | .............. | G01B 9/02 |
| KR | 20170022816 A | | 3/2017 | | |
| WO | WO-2009/009081 A2 | | 1/2009 | | |
| WO | WO-2019/044336 A1 | | 3/2019 | | |
| WO | WO-2020013325 A1 | * | 1/2020 | ......... | G01N 21/1717 |

OTHER PUBLICATIONS

Kang Sungsam et al, "High-resolution adaptive optical imaging within thick scattering media using closed-loop accumulation of single scattering", Nature Communications vol. 8, No. 1, Dec. 1, 2017, p. 1-p. 10, XP055946530.

* cited by examiner (a)

(b)

(c)

VERTICAL DIRECTION SHEAR

REAL PART                          IMAGINARY PART

HORIZONTAL DIRECTION SHEAR

REAL PART                          IMAGINARY PART

VERTICAL DIRECTION SHEAR

REAL PART

IMAGINARY PART

HORIZONTAL DIRECTION SHEAR

REAL PART

IMAGINARY PART

VERTICAL DIRECTION SHEAR

HORIZONTAL DIRECTION SHEAR (b)

(a)

OBSERVATION DEVICE AND OBSERVATION METHOD

TECHNICAL FIELD

The present disclosure relates to an observation apparatus and an observation method.

BACKGROUND ART

In recent years, a technique for producing a three-dimensional cell tissue called a spheroid or an organoid has been developed. Further, a study for applying the above three-dimensional cell tissues to drug development, regenerative medicine, and the like has been developed. The above three-dimensional cell tissue is an optically transparent multiple scattering object. As a technique for imaging the optically transparent scattering object, various methods have been proposed. In these techniques, examples of an imaging technique using a fluorescent probe include a confocal microscope, a multiphoton microscope, and a light sheet microscope. In addition, as a non-staining and non-invasive imaging technique without using a fluorescent probe, optical coherence tomography (OCT) is known.

The non-staining and non-invasive imaging is often desired for an observation object such as the spheroid or the organoid, however, there are not many reports in which the OCT has been applied to the imaging of the above observation object. The reason may be that a resolution of the imaging by the OCT is low, and it is difficult to interpret a signal obtained by the imaging by the OCT. Therefore, it can be said that the non-staining imaging technique for the three-dimensional cell tissue which can be a gold standard has not been established at present.

A quantitative phase imaging (QPI) is also known as a technique capable of imaging an optical path length of the observation object in a non-staining and non-invasive manner. The QPI can acquire physical information such as the optical path length of the observation object (for example, a cell), and thus, application of the QPI is progressing in a biological field. Images acquired by the QPI can be used to generate other types of images, such as a differential interference image and a phase contrast microscope image. The QPI is a technique capable of acquiring an image having a relatively large amount of information, and is expected to be applicable to a higher content analysis than a conventional analysis using a bright field image. Further, the high content analysis using the non-staining imaging technique has been actively studied due to improvement in image recognition accuracy by machine learning in recent years, and the non-staining imaging of the multiple scattering object is expected to play an important role in the future. However, the QPI cannot grasp a true three-dimensional structure because the acquired image is merely a two-dimensional projection of the optical path length.

Further, optical diffraction tomography (ODT) described in Patent Document 1 is also known as a technique capable of imaging the optical path length of the observation object in a non-staining and non-invasive manner. The ODT is a development of the QPI into a technique capable of three-dimensional imaging, and can realize three-dimensional refractive index tomography of the observation object. Performing cell observation using the ODT enables identification of organelles such as cell nuclei and mitochondria, and further, enables tracking of three-dimensional structural changes, and is expected to enable higher content analysis than the QPI.

CITATION LIST

Patent Literature

Patent Document 1: Japanese Patent Application Laid-Open Publication No. 2017-219826

Non Patent Literature

Non Patent Document 1: Sungsam Kang, et al, "Imaging deep within a scattering medium using collective accumulation of single-scattered waves," NATURE PHOTONICS, Vol. 9, pp. 253-258 (2015).

SUMMARY OF INVENTION

Technical Problem

However, although the conventional ODT can be applied to the observation of several cells, it is difficult to apply the ODT to the observation of the multiple scattering object such as the three-dimensional cell tissue described above. This is because, in the conventional ODT, when a large amount of multiple scattered light occurs in the observation object, influence of the multiple scattered light significantly appears in the acquired image.

Light scattering refers to a phenomenon in which light interacts with an object to change a traveling direction of the light. In particular, when spatial non-uniformity of a refractive index in the object increases, the light interacts with the object many times in passing through the object. The light which interacts with the object many times as described above is referred to as the multiple scattered light. On the other hand, the light which interacts with the object only once is referred to as single scattered light. It is known that the multiple scattered light causes an increase in speckle and a deterioration in single-scattering to multi-scattering ratio (SMR), and thus, becomes a barrier for the measurement.

The speckle is generated by a large change in intensity or phase caused spatially by interference of the multiple scattered light when the light is temporally and spatially coherent. In order to suppress speckle generation, a light source which outputs temporally or spatially incoherent light may be used. For example, a general bright field microscope such as a phase contrast microscope acquires an image without speckles by using a spatially and temporally incoherent light source such as a halogen lamp or a light emitting diode.

The deterioration of the SMR is caused by that the multiple scattered light becomes dominant over the single scattered light, and the single scattered light is buried in the multiple scattered light. As the observation object becomes larger and an observation depth becomes deeper, a component of the single scattered light exponentially decreases, whereas a component of the multiple scattered light increases. A scattering direction of the single scattered light has a direct correspondence relationship with a structure of the object, and thus, it is easily used to measure the structure of the object. On the other hand, the relationship between the multiple scattered light and the structure of the object is complex, and it is difficult to extract information on the structure of the object. Therefore, in the imaging technique using the single scattered light, it is known that the measurement fails when the single scattered light is buried in the multiple scattered light (that is, when the SMR deteriorates).

The suppression of the SMR deterioration is possible by a technique called gating for selectively detecting the single scattered light out of the single scattered light and the multiple scattered light. The multiple scattered light is suppressed by the gating, and thus, the speckles can be suppressed at the same time as the SMR deterioration is suppressed. The gating is achieved using degrees of freedom such as space, time, and polarization. The confocal microscope is an example of the spatial gating. The OCT is an example of the temporal and spatial gating.

The conventional ODT does not remove the influence of the multiple scattered light, and thus, the speckle increases in the acquired image and the SMR deteriorates, when the multiple scattered light generated in the observation object is large. Therefore, although the conventional ODT can be applied to the observation of several cells in which the occurrence of the multiple scattered light is small, it is difficult to apply the ODT to the observation of the multiple scattering object such as the three-dimensional cell tissue in which the occurrence of the multiple scattered light is large.

The present invention has been made to solve the above problem, and an object thereof is to provide an observation apparatus and an observation method capable of realizing three-dimensional refractive index tomography in which influence of multiple scattered light is reduced even when an observation object is a multiple scattering object.

Solution to Problem

A first aspect of the present invention is an observation apparatus. The observation apparatus includes (1) an interference intensity image acquisition unit for acquiring, for each of a plurality of light irradiation directions, an interference intensity image at a reference position generated by interference between light irradiating an observation object along each of the plurality of light irradiation directions and passed through the observation object and reference light; (2) a first complex amplitude image generation unit for generating a complex amplitude image at the reference position based on the interference intensity image at the reference position for each of the plurality of light irradiation directions; and (3) a two-dimensional phase image generation unit for generating a two-dimensional phase image based on the complex amplitude image of each of the plurality of light irradiation directions.

A second aspect of the present invention is an observation method. The observation method includes (1) an interference intensity image acquisition step of acquiring, for each of a plurality of light irradiation directions, an interference intensity image at a reference position generated by interference between light irradiating an observation object along each of the plurality of light irradiation directions and passed through the observation object and reference light; (2) a first complex amplitude image generation step of generating a complex amplitude image at the reference position based on the interference intensity image at the reference position for each of the plurality of light irradiation directions; and (3) a two-dimensional phase image generation step of generating a two-dimensional phase image based on the complex amplitude image of each of the plurality of light irradiation directions.

A third aspect of the present invention is a program, and the program is a program for causing a computer to execute the steps of the above observation method. A fourth aspect of the present invention is a recording medium, and the recording medium is a computer readable recording medium recording the above program.

Advantageous Effects of Invention

According to the aspects of the present invention, it is possible to realize three-dimensional refractive index tomography in which influence of multiple scattered light is reduced even when an observation object is a multiple scattering object.

DESCRIPTION OF EMBODIMENTS

Hereinafter, embodiments for carrying out the present invention will be described in detail with reference to the accompanying drawings. In the description of the drawings, the same elements will be denoted by the same reference signs, and redundant description will be omitted. The present invention is not limited to these examples, and the Claims, their equivalents, and all the changes within the scope are intended as would fall within the scope of the present invention.

Figure 1:
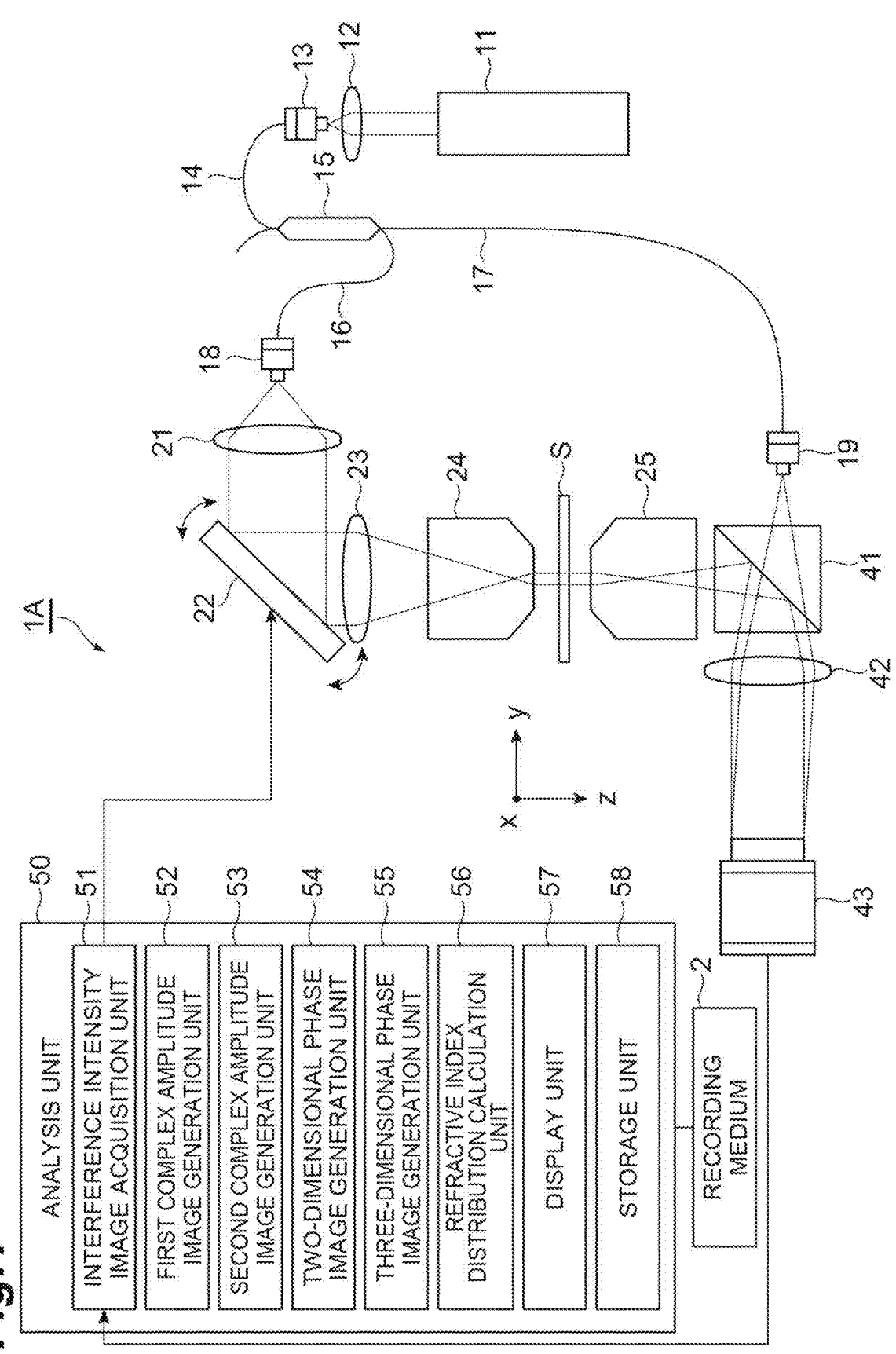
FIG. 1 is a diagram illustrating a configuration of an observation apparatus 1A.

FIG. 1 is a diagram illustrating a configuration of an observation apparatus 1A. The observation apparatus 1A includes a light source 11, a lens 12, a lens 21, a mirror 22, a lens 23, a condenser lens 24, an objective lens 25, a beam splitter 41, a lens 42, an imaging unit 43, and an analysis unit 50.

The light source 11 outputs spatially and temporally coherent light, and is preferably a laser light source. The lens 12 is optically coupled to the light source 11, focuses the light output from the light source 11 on a light input end 13 of an optical fiber 14, and inputs the light to the light input end 13. The optical fiber 14 guides the light input to the light input end 13 by the lens 12 to a fiber coupler 15. The fiber coupler 15 couples the light between the optical fiber 14 and optical fibers 16 and 17, splits the light guided by and arriving from the optical fiber 14 into two beams, guides one split light by the optical fiber 16, and guides the other split light by the optical fiber 17. The light guided by the optical fiber 16 is output as diverging light from a light output end 18. The light guided by the optical fiber 17 is output as diverging light from a light output end 19.

The lens 21 is optically coupled to the light output end 18, and collimates the light output as the diverging light from the light output end 18. The mirror 22 is optically coupled to the lens 21, and reflects the light arriving from the lens 21 to the lens 23. An orientation of a reflection surface of the mirror 22 is changeable. The lens 23 is optically coupled to the mirror 22. The condenser lens 24 is optically coupled to the lens 23. The lens 23 and the condenser lens 24 preferably constitute a 4f optical system. The lens 23 and the condenser lens 24 irradiate an observation object S with the light from a light irradiation direction according to the orientation of the reflection surface of the mirror 22. The objective lens 25 is optically coupled to the condenser lens 24. The observation object S is disposed between the objective lens 25 and the condenser lens 24. The objective lens 25 inputs the light (object light) output from the condenser lens 24 and passed through the observation object S, and outputs the light to the beam splitter 41.

The beam splitter 41 is optically coupled to the objective lens 25, and further, is optically coupled also to the light output end 19. The beam splitter 41 combines the light (object light) output and arriving from the objective lens 25 and the light (reference light) output and arriving from the light output end 19, and outputs the light to the lens 42. The lens 42 is optically coupled to the beam splitter 41, collimates the object light and the reference light arriving from the beam splitter 41, and outputs the light to the imaging unit 43. The imaging unit 43 is optically coupled to the lens 42, and images an interference fringe image (interference intensity image) generated by interference between the object light and the reference light arriving from the lens 42. An incident direction of the reference light is inclined with respect to an incident direction of the object light on an imaging plane of the imaging unit 43. A position at which the object light and the reference light are combined by the beam splitter 41 may be in the subsequent stage of the imaging lens, and in addition, in consideration of the influence of aberration, it is desirable that the position is set between the objective lens 25 and the lens 42 as illustrated in the diagram.

The analysis unit 50 is electrically connected to the imaging unit 43, and inputs the interference intensity image captured by the imaging unit 43. The analysis unit 50 calculates a three-dimensional refractive index distribution of the observation object S by processing the input interference intensity image. The analysis unit 50 may be a computer. The analysis unit 50 includes an interference intensity image acquisition unit 51, a first complex amplitude image generation unit 52, a second complex amplitude image generation unit 53, a two-dimensional phase image generation unit 54, a three-dimensional phase image generation unit 55, a refractive index distribution calculation unit 56, a display unit 57, and a storage unit 58.

The interference intensity image acquisition unit 51 irradiates the observation object S with the light along each of a plurality of light irradiation directions by changing the orientation of the reflection surface of the mirror 22. Further, the interference intensity image acquisition unit 51 acquires the interference intensity image at a reference position for each of the plurality of light irradiation directions from the imaging unit 43. The interference intensity image acquisition unit 51 includes a CPU, has an output port for outputting a control signal for changing the orientation of the reflection surface of the mirror 22, and has an input port for inputting the interference intensity image from the imaging unit 43. It is not necessary to move the objective lens 25 in an optical axis direction. The reference position is an image plane position having a conjugate relationship with respect to the imaging plane of the imaging unit 43.

The first complex amplitude image generation unit 52, the second complex amplitude image generation unit 53, the two-dimensional phase image generation unit 54, the three-dimensional phase image generation unit 55, and the refractive index distribution calculation unit 56 perform processing based on the interference intensity images, and include a processing device such as a CPU, a DSP, or an FPGA. The display unit 57 displays an image to be processed, an image in the middle of the processing, an image after the processing, and the like, and includes, for example, a liquid crystal display. The storage unit 58 stores data of various images, and includes a hard disk drive, a flash memory, a RAM, a ROM, and the like. The first complex amplitude image generation unit 52, the second complex amplitude image generation unit 53, the two-dimensional phase image generation unit 54, the three-dimensional phase image generation unit 55, the refractive index distribution calculation unit 56, and the storage unit 58 may be constituted by a cloud computing.

The storage unit 58 also stores a program for causing the interference intensity image acquisition unit 51, the first complex amplitude image generation unit 52, the second complex amplitude image generation unit 53, the two-dimensional phase image generation unit 54, the three-dimensional phase image generation unit 55, and the refractive index distribution calculation unit 56 to execute respective steps of the processing. The program may be stored in the storage unit 58 at the time of manufacture or shipment of the observation apparatus 1A, may be acquired via a communication line after shipment and then stored in the storage unit 58, or may be recorded in a computer readable recording medium 2 and then stored in the storage unit 58. The recording medium 2 may be an arbitrary medium such as a flexible disk, a CD-ROM, a DVD-ROM, a BD-ROM, or a USB memory.

The details of the processing of each of the interference intensity image acquisition unit 51, the first complex amplitude image generation unit 52, the second complex amplitude image generation unit 53, the two-dimensional phase image generation unit 54, the three-dimensional phase image generation unit 55, and the refractive index distribution calculation unit 56 will be described later.

Figure 2:
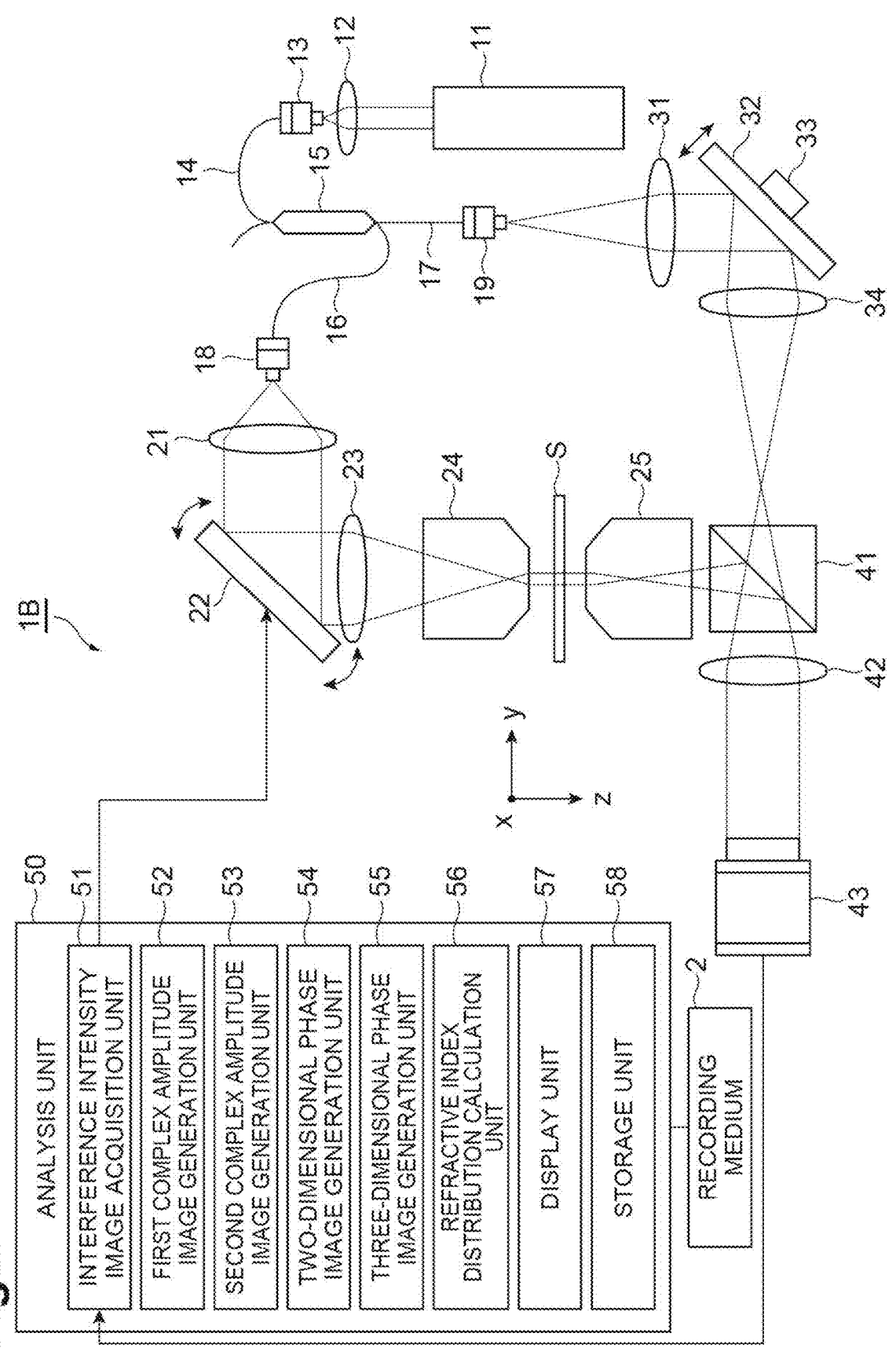
FIG. 2 is a diagram illustrating a configuration of an observation apparatus 1B.

FIG. 2 is a diagram illustrating a configuration of an observation apparatus 1B. The observation apparatus 1B illustrated in FIG. 2 includes a lens 31, a mirror 32, and a lens 34 in addition to the configuration of the observation apparatus 1A illustrated in FIG. 1.

The lens 31 is optically coupled to the light output end 19, and collimates the light (reference light) output as diverging light from the light output end 19. The mirror 32 is optically coupled to the lens 31, and reflects the light arriving from the lens 31 to the lens 34. The lens 34 is optically coupled to the mirror 32, and outputs the light arriving from the mirror 32 to the beam splitter 41. The light output from the lens 34 is once focused before the beam splitter 41, and then input to the beam splitter 41 as diverging light. The beam splitter 41 combines the light (object light) output and arriving from the objective lens 25 and the light (reference light) output and arriving from the lens 34, and outputs the light to the lens 42 in a coaxial manner. The imaging unit 43 images the interference fringe image (interference intensity image) generated by interference between the object light and the reference light arriving from the lens 42. The incident direction of the reference light is parallel to the incident direction of the object light on the imaging plane of the imaging unit 43.

A drive unit 33 moves the mirror 32 in a direction perpendicular to a reflection surface of the mirror 32. The drive unit 33 is, for example, a piezoelectric actuator. The movement of the mirror 32 changes an optical path difference (phase difference) of the object light and the reference light from light splitting by the fiber coupler 15 to combining by the beam splitter 41. When the optical path difference is different, the interference intensity image captured by the imaging unit 43 is also different.

Figure 3:
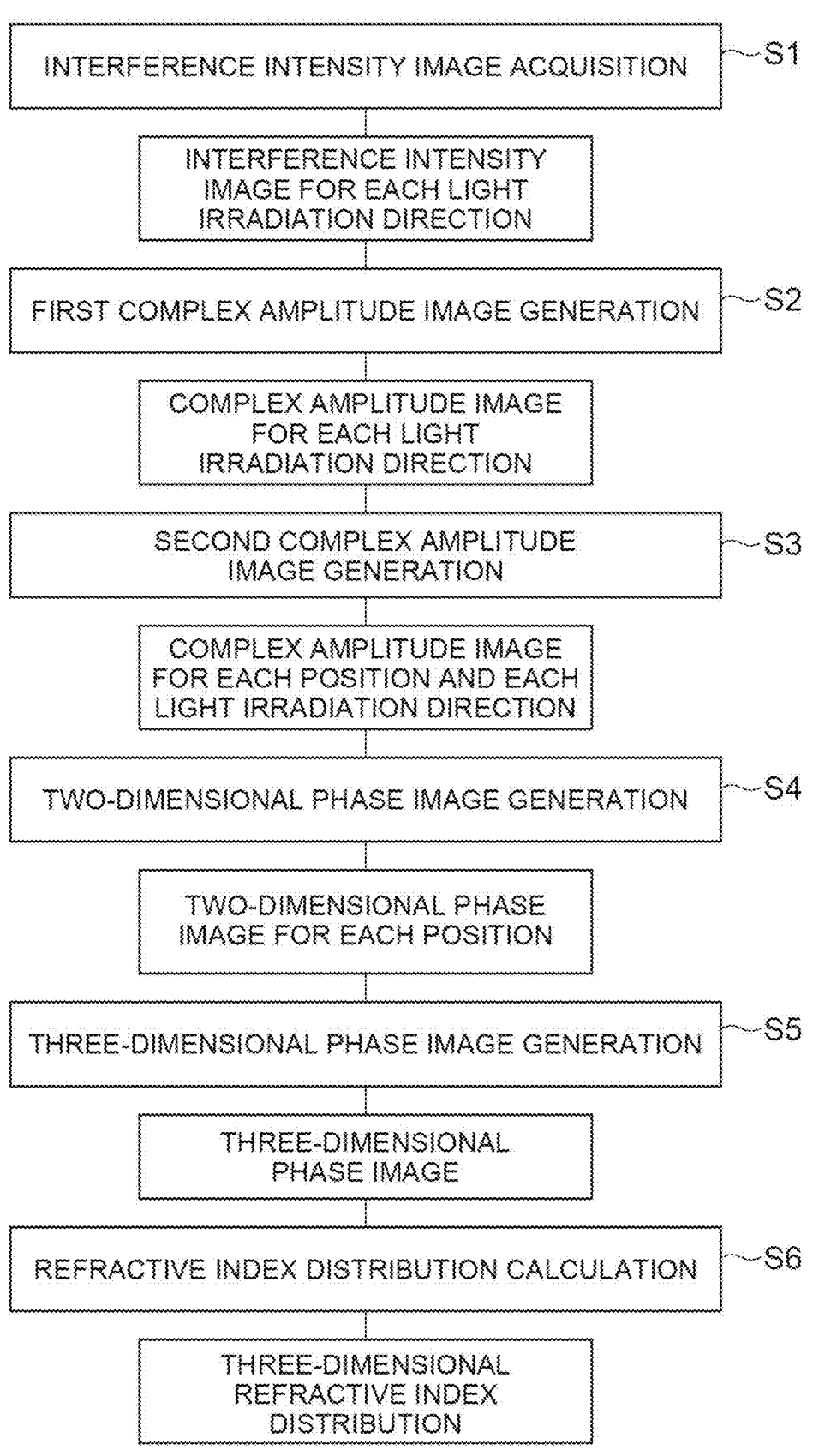
FIG. 3 is a flowchart of an observation method.

FIG. 3 is a flowchart of an observation method. This observation method can be applied to both of the observation apparatus 1A (FIG. 1) and the observation apparatus 1B (FIG. 2). The observation method includes an interference intensity image acquisition step S1, a first complex amplitude image generation step S2, a second complex amplitude image generation step S3, a two-dimensional phase image generation step S4, a three-dimensional phase image generation step S5, and a refractive index distribution calculation step S6.

The processing of the interference intensity image acquisition step S1 is performed by the interference intensity image acquisition unit 51. The processing of the first complex amplitude image generation step S2 is performed by the first complex amplitude image generation unit 52. The processing of the second complex amplitude image generation step S3 is performed by the second complex amplitude image generation unit 53. The processing of the two-dimensional phase image generation step S4 is performed by the two-dimensional phase image generation unit 54. The processing of the three-dimensional phase image generation step S5 is performed by the three-dimensional phase image generation unit 55. The processing of the refractive index distribution calculation step S6 is performed by the refractive index distribution calculation unit 56.

In the interference intensity image acquisition step S1, the interference intensity image acquisition unit 51 irradiates the observation object S with the light along each of the plurality of light irradiation directions by changing the orientation of the reflection surface of the mirror 22. Further, the interference intensity image acquisition unit 51 acquires the interference intensity image at the reference position for each of the plurality of light irradiation directions from the imaging unit 43.

In FIG. 1 and FIG. 2, an xyz orthogonal coordinate system is illustrated for convenience of explanation. The z-axis is parallel to the optical axis of the objective lens 25. The reference position is the image plane position having a conjugate relationship with respect to the imaging plane of the imaging unit 43. This position is set to z=0. The light irradiation direction on the observation object S can be represented by $k_x$ and $k_y$ in a wavenumber vector $(k_x, k_y, k_z)$ of the irradiation light.

Figure 4:
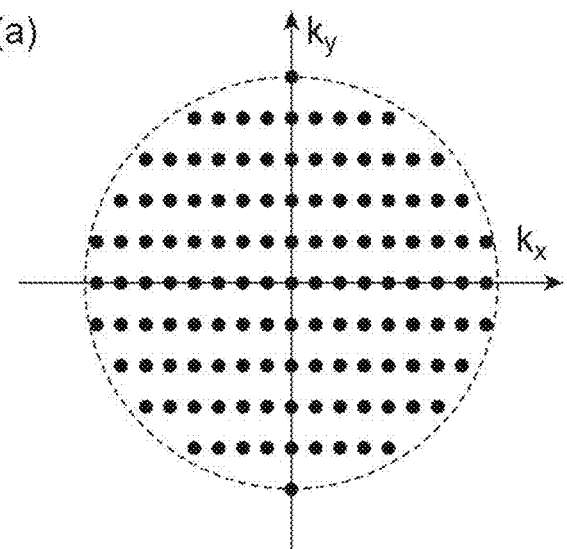
FIG. 4 includes (a)-(c) diagrams illustrating examples of scanning of a light irradiation direction on an observation object S in an interference intensity image acquisition step S1.
Figure 4:
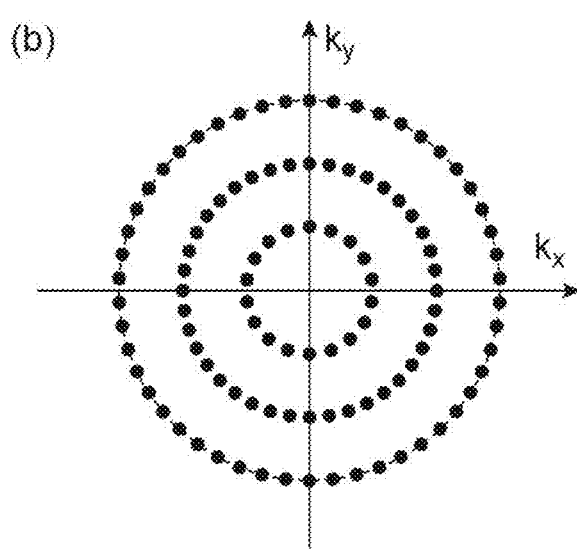
Figure 4:
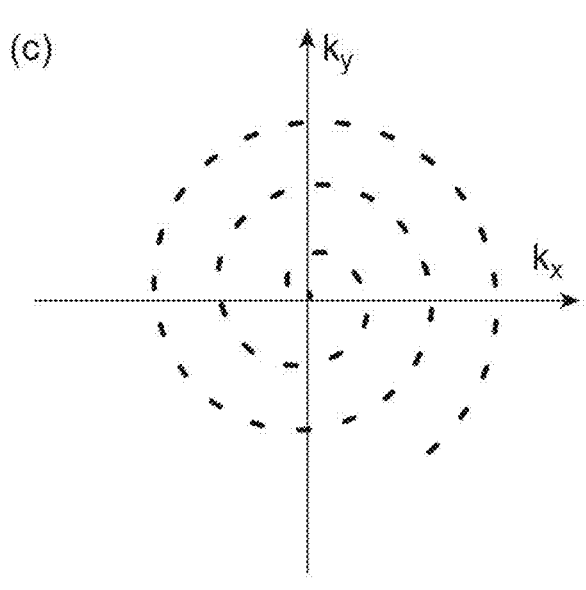

(a) to (c) in FIG. 4 are diagrams illustrating examples of scanning of the light irradiation direction on the observation object S in the interference intensity image acquisition step S1. In the diagram, a position of each circular point represents the light irradiation direction in the $k_x k_y$ plane in which the horizontal axis is set to $k_x$ and the vertical axis is set to $k_y$. The scanning of the light irradiation direction may be arranged in a rectangular lattice shape in the $k_x k_y$ plane as illustrated in (a) in FIG. 4, may be arranged on a circumference of each of a plurality of concentric circles in the $k_x k_y$ plane as illustrated in (b) in FIG. 4, or may be arranged in a spiral shape in the $k_x k_y$ plane as illustrated in (c) in FIG. 4. In any of the cases, the light irradiation direction can be scanned as far as it is allowed by NA of the condenser lens 24. Raster scan or random scan may be used. In the case of the raster scan, return scan may be performed or may not be performed.

In the first complex amplitude image generation step S2, the first complex amplitude image generation unit 52 generates, for each of the plurality of light irradiation directions, a complex amplitude image at the reference position based on the interference intensity image at the reference position acquired by the interference intensity image acquisition unit 51. In the case of the observation apparatus 1A (FIG. 1), the first complex amplitude image generation unit 52 can generate the complex amplitude image based on one interference intensity image by a Fourier fringe analysis method. In the case of the observation apparatus 1B (FIG. 2), the first complex amplitude image generation unit 52 can generate the complex amplitude image based on three or more interference intensity images having different optical path differences (phase differences) between the object light and the reference light by a phase shift method.

In the second complex amplitude image generation step S3, the second complex amplitude image generation unit 53 generates, for each of the plurality of light irradiation directions, a complex amplitude image of each of a plurality of z direction positions based on the complex amplitude image at the reference position (z=0) generated by the first complex amplitude image generation unit 52. Assuming that a two-dimensional Fourier transform of the complex amplitude image u(x, y, 0) at the reference position is $U(k_x, k_y, 0)$, the complex amplitude image u(x, y, d) at the position of z=d and the two-dimensional Fourier transform $U(k_x, k_y, d)$ of the complex amplitude image u(x, y, d) are represented by the following Formulas. i is an imaginary unit, and $k_0$ is a wavenumber of the light in the observation object.

[Formula 1]

$$U(k_x,k_y,d)=U(k_x,k_y,0)\exp(i\sqrt{k_0^2-k_x^2-k_y^2}d) \qquad (1)$$

[Formula 2]

$$u(x,y,d)=U(k_x,k_y,d)\exp(-ik_xx-ik_yy)dk_xdk_y \qquad (2)$$

In the two-dimensional phase image generation step S4, the two-dimensional phase image generation unit 54 generates, for each of the plurality of positions, a two-dimensional phase image based on the complex amplitude image of each of the plurality of light irradiation directions generated by the second complex amplitude image generation unit 53. The two-dimensional phase image generated in this step corresponds to a phase image centered on the focused z direction position. The details of the two-dimensional phase image generation step S4 will be described later.

In addition, the two-dimensional phase image generation step S4 and the subsequent steps may be performed after all the complex amplitude images at the plurality of positions are generated for each of the plurality of light irradiation directions in the second complex amplitude image generation step S3. Further, processes of generating the complex amplitude image at one certain z direction position for each of the plurality of light irradiation directions in the second complex amplitude image generation step S3 and generating the two-dimensional phase image at the position in the two-dimensional phase image generation step S4 may be set as a unit, and the unit process may be repeatedly performed while scanning the z direction position. The latter case is preferable in that a capacity of image data to be stored in the storage unit 58 can be reduced.

In the three-dimensional phase image generation step S5, the three-dimensional phase image generation unit 55 generates a three-dimensional phase image based on the two-dimensional phase image at each of the plurality of positions generated by the two-dimensional phase image generation unit 54. The three-dimensional phase image generated in this step is an image in which the positions x and y in the two-dimensional phase image and the position z of the two-dimensional phase image are variables.

In the refractive index distribution calculation step S6, the refractive index distribution calculation unit 56 obtains a three-dimensional refractive index distribution of the observation object by deconvolution based on the three-dimensional phase image generated by the three-dimensional phase image generation unit 55. Assuming that the refractive index distribution of the observation object is n(x, y, z), an electric susceptibility distribution is f(x, y, z), and a refractive index of a background medium is $n_m$, there is a relationship of the following Formula (3) between them. The three-dimensional phase image $\Phi(x, y, z)$ generated by the three-dimensional phase image generation unit 55 is represented by convolution of a kernel function g(x, y, z) and the electric susceptibility distribution f(x, y, z) as shown in the following Formula (4). Therefore, the three-dimensional refractive index distribution n(x, y, z) of the observation object can be obtained by deconvolution based on the three-dimensional phase image $\Phi(x, y, z)$.

[Formula 3]

$$f(x,y,z)=k_0^2[(n(x,y,z)/n_m)^2-1] \qquad (3)$$

[Formula 4]

$$\Phi(x,y,z)=\int g(x-x',y-y',z-z')f(x',y',z')dx'dy'dz' \qquad (4)$$

Figure 5:
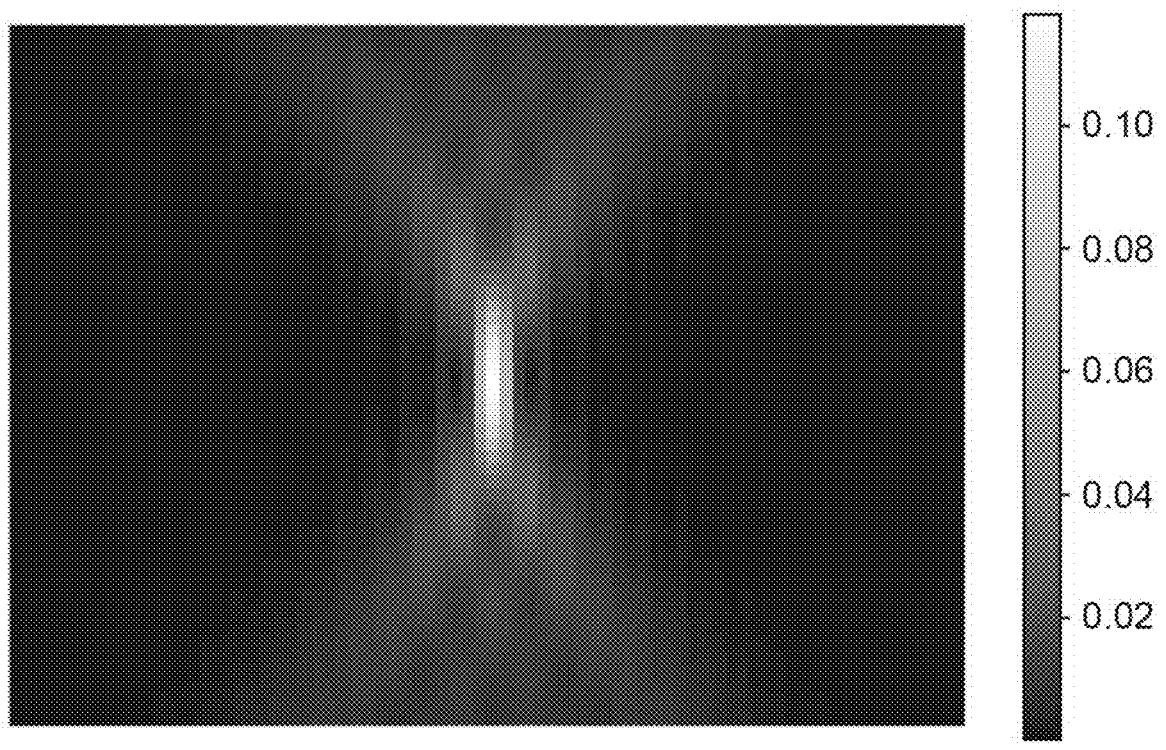
FIG. 5 is a diagram showing a kernel function g.

In addition, the kernel function g is a function based on a Green function corresponding to a solution of a wave equation. FIG. 5 is a diagram showing the kernel function g. In this diagram, a center position having the largest value of the kernel function g is the origin, the vertical direction is the z axis, and the horizontal direction is the direction perpendicular to the z axis.

Next, the details of the two-dimensional phase image generation step S4 will be described. In the two-dimensional phase image generation step S4, the two-dimensional phase image generation unit 54 generates, for each of the plurality of positions, the two-dimensional phase image based on the complex amplitude images of the plurality of light irradiation directions generated by the second complex amplitude image generation unit 53. The two-dimensional phase image generation step S4 may include three aspects described below.

Figure 6:
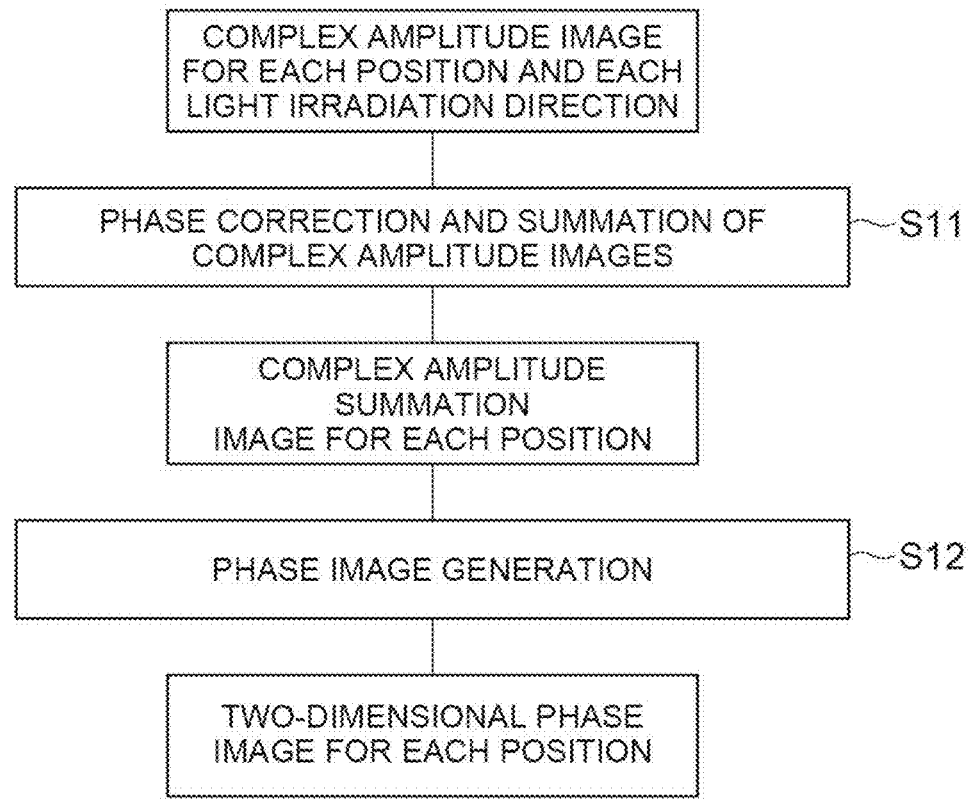
FIG. 6 is a flowchart of a first aspect of a two-dimensional phase image generation step S4.

FIG. 6 is a flowchart of a first aspect of the two-dimensional phase image generation step S4. In the first aspect, for each of the plurality of positions, the two-dimensional phase image generation step S4, in a step S11, corrects the phase of the complex amplitude image of each of the plurality of light irradiation directions based on the light irradiation direction, and then generates a complex amplitude summation image representing a summation of the complex amplitude images after the correction, and in a step S12, generates the two-dimensional phase image based on the complex amplitude summation image.

The processing of the step S11 is based on a collective accumulation of single scattering (CASS) technique described in Non Patent Document 1. In the light with which the object is irradiated along a certain light irradiation direction and passed through the object, a spatial frequency distribution of the single scattered light which interacts with the object only once is shifted according to the light irradiation direction, whereas a spatial frequency distribution of the multiple scattered light which interacts with the object a plurality of times randomly changes according to the light irradiation direction. The CASS technique uses the above difference between the light irradiation direction dependencies of the spatial frequency distributions of the single scattered light and the multiple scattered light.

That is, in the step S11, the phase of the complex amplitude image of each of the plurality of light irradiation directions is corrected based on the light irradiation direction (that is, the spatial frequency distribution of the complex amplitude image is shifted in parallel according to the light irradiation direction in the spatial frequency domain), so that the spatial frequency distribution of the single scattered light component in the complex amplitude image has a shape and arrangement independent of the light irradiation direction, while the spatial frequency distribution of the multiple scattered light component in the complex amplitude image has a random shape and arrangement. Further, in the step S11, the complex amplitude summation image representing the summation of the plurality of complex amplitude images after the above correction is generated (that is, synthetic aperture processing is performed) to coherently sum the single scattered light components in the complex amplitude images, while the multiple scattered light components in the complex amplitude images cancel each other out.

Therefore, the influence of the multiple scattered light is reduced in the complex amplitude summation image generated in the step S11. Further, the three-dimensional refractive index distribution obtained finally in the refractive index distribution calculation step S6 also reduces the influence of the multiple scattered light, suppresses the speckles, and improves the SMR.

Figure 7:
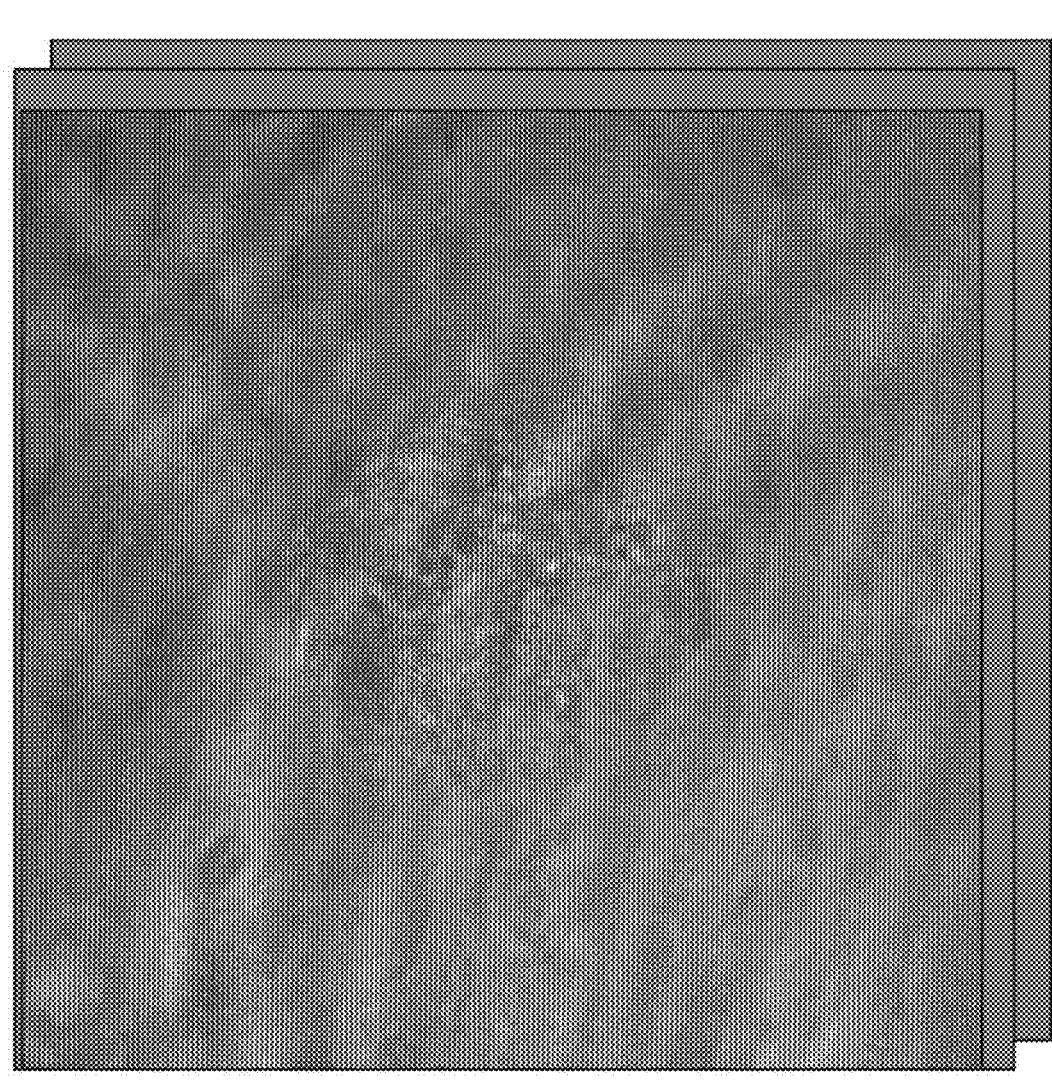
FIG. 7 is an interference intensity image (with vertical irradiation) acquired in the interference intensity image acquisition step S1.
Figure 8:
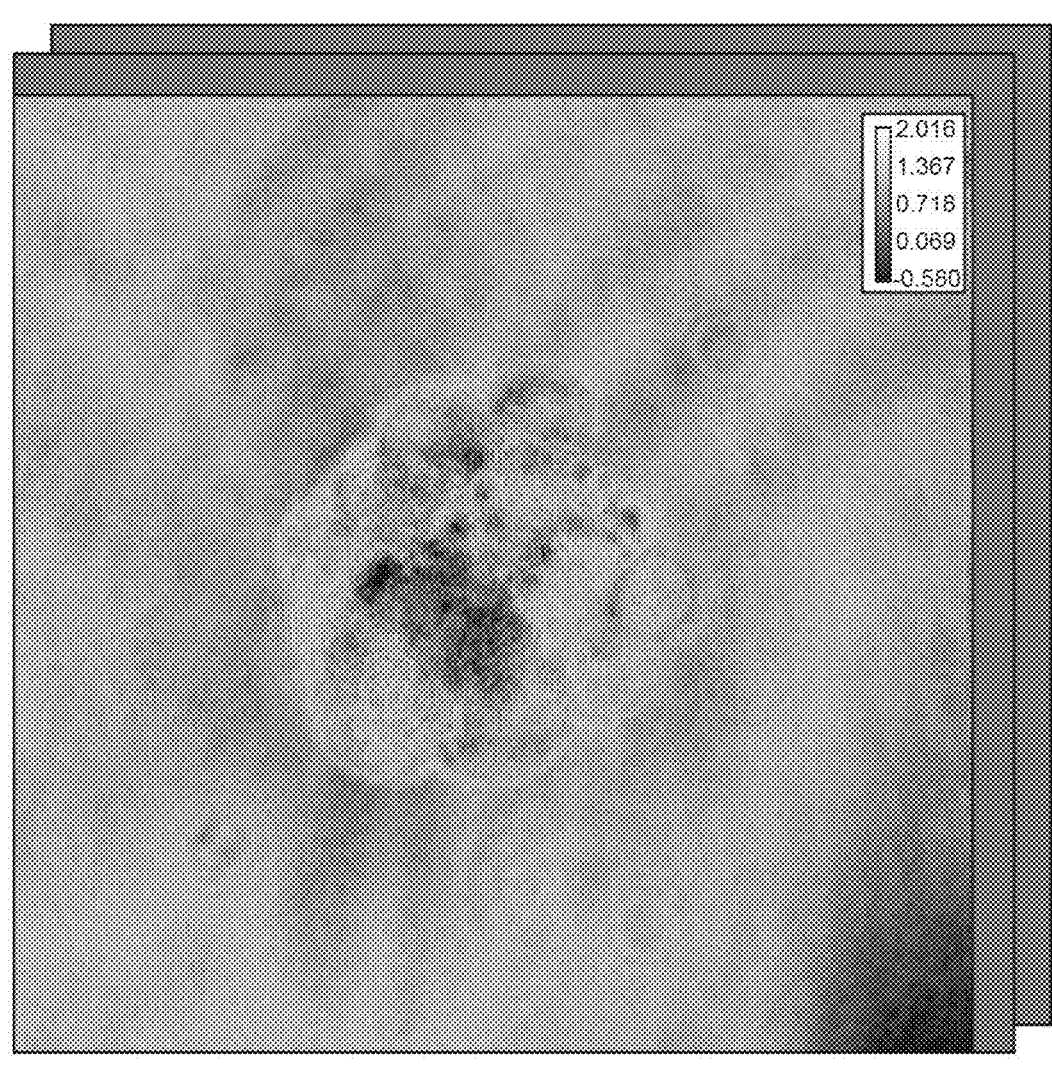
FIG. 8 is a complex amplitude image (real part, z=0) generated based on the interference intensity image (FIG. 7) in a first complex amplitude image generation step S2.
Figure 9:
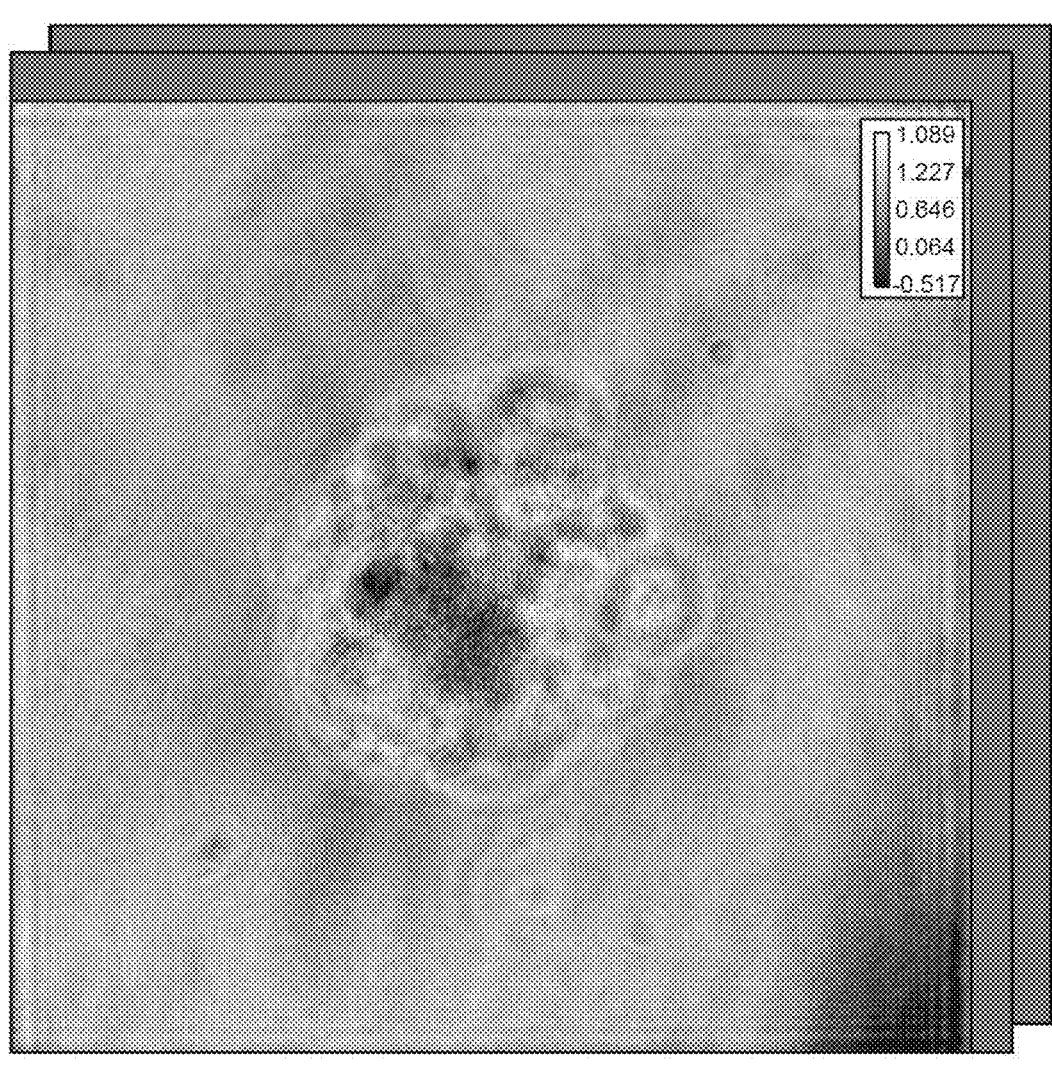
FIG. 9 is a complex amplitude image (real part, z=10 μm) generated based on the complex amplitude image (FIG. 8) in a second complex amplitude image generation step S3.

FIG. 7 to FIG. 12 are diagrams showing examples of the images obtained in the steps in the case of the first aspect of the two-dimensional phase image generation step S4. These images are based on the Fourier fringe analysis method using the observation apparatus 1A (FIG. 1). FIG. 7 shows the interference intensity image (with vertical irradiation) acquired in the interference intensity image acquisition step S1. FIG. 8 shows the complex amplitude image (real part, z=0) generated based on the interference intensity image (FIG. 7) in the first complex amplitude image generation step S2. FIG. 9 shows the complex amplitude image (real part, z=10 μm) generated based on the complex amplitude image (FIG. 8) in the second complex amplitude image generation step S3.

Figure 10:
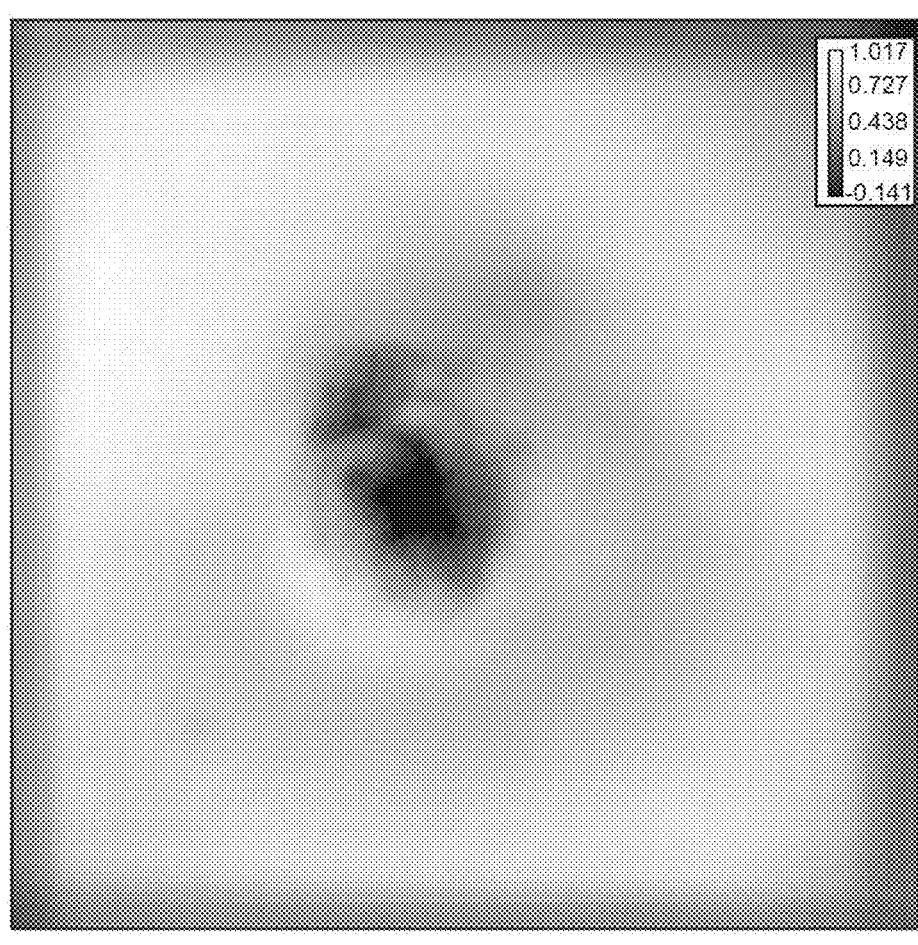
FIG. 10 is a complex amplitude summation image (real part) generated based on the complex amplitude image (FIG. 9) in a step S11 in the two-dimensional phase image generation step S4.
Figure 11:
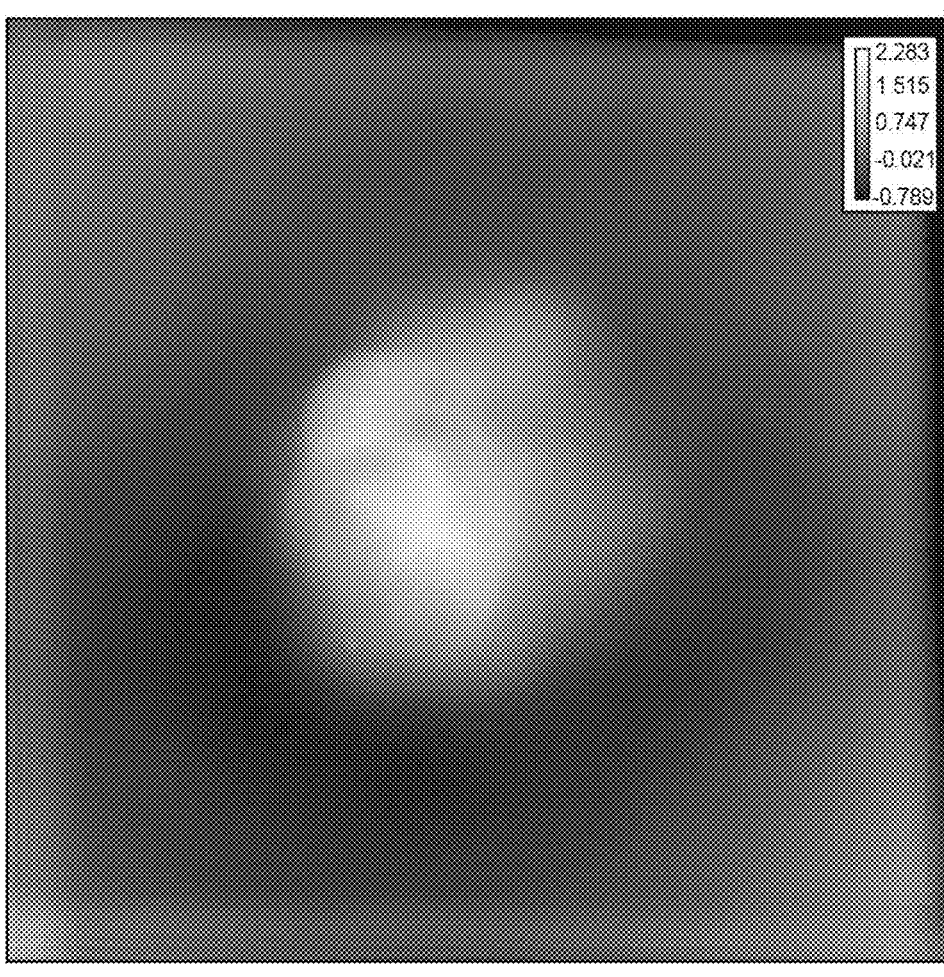
FIG. 11 is a two-dimensional phase image generated based on the complex amplitude summation image (FIG. 10) in a step S12 in the two-dimensional phase image generation step S4.
Figure 12:
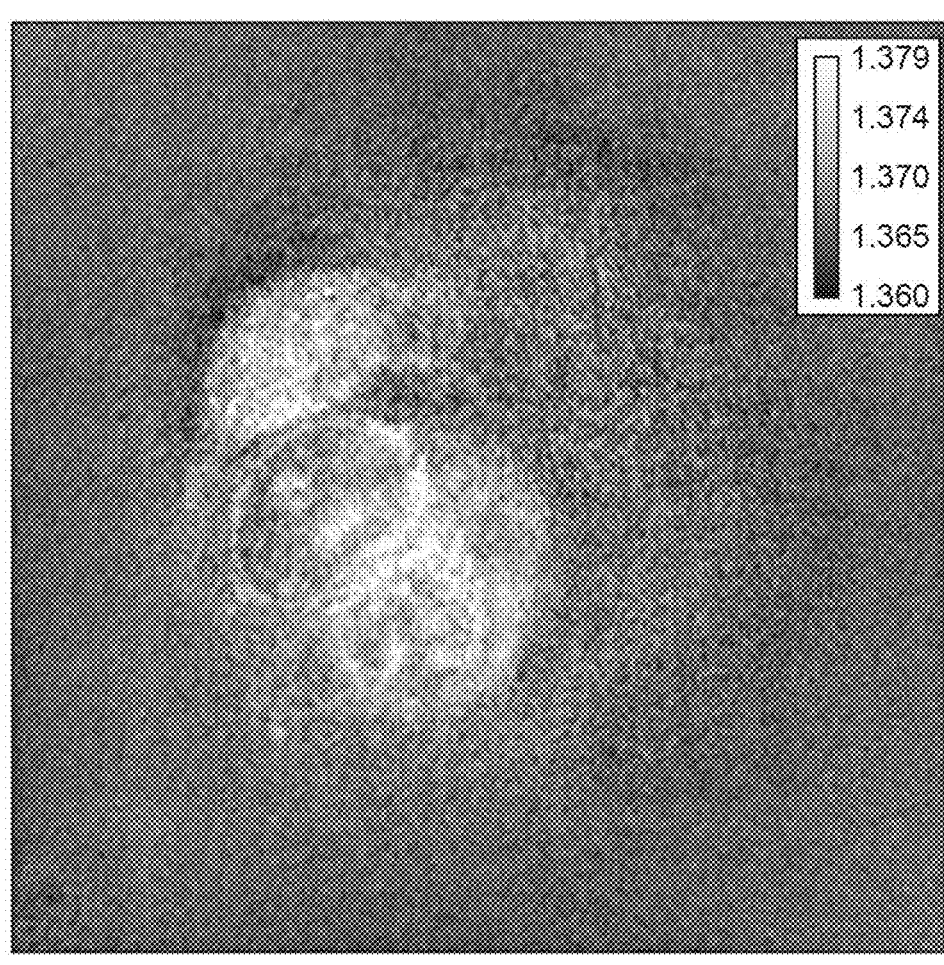
FIG. 12 is an image at a certain z position of a three-dimensional refractive index distribution obtained in a refractive index distribution calculation step S6.

FIG. 10 shows the complex amplitude summation image (real part) generated based on the complex amplitude image (FIG. 9) in the step S11 in the two-dimensional phase image generation step S4. FIG. 11 shows the two-dimensional phase image generated based on the complex amplitude summation image (FIG. 10) in the step S12 in the two-dimensional phase image generation step S4. FIG. 12 shows the image at a certain z position of the three-dimensional refractive index distribution obtained in the refractive index distribution calculation step S6. In this way, in the obtained three-dimensional refractive index distribution, the influence of the multiple scattered light is reduced, the speckles are suppressed, and the SMR is improved.

Figure 13:
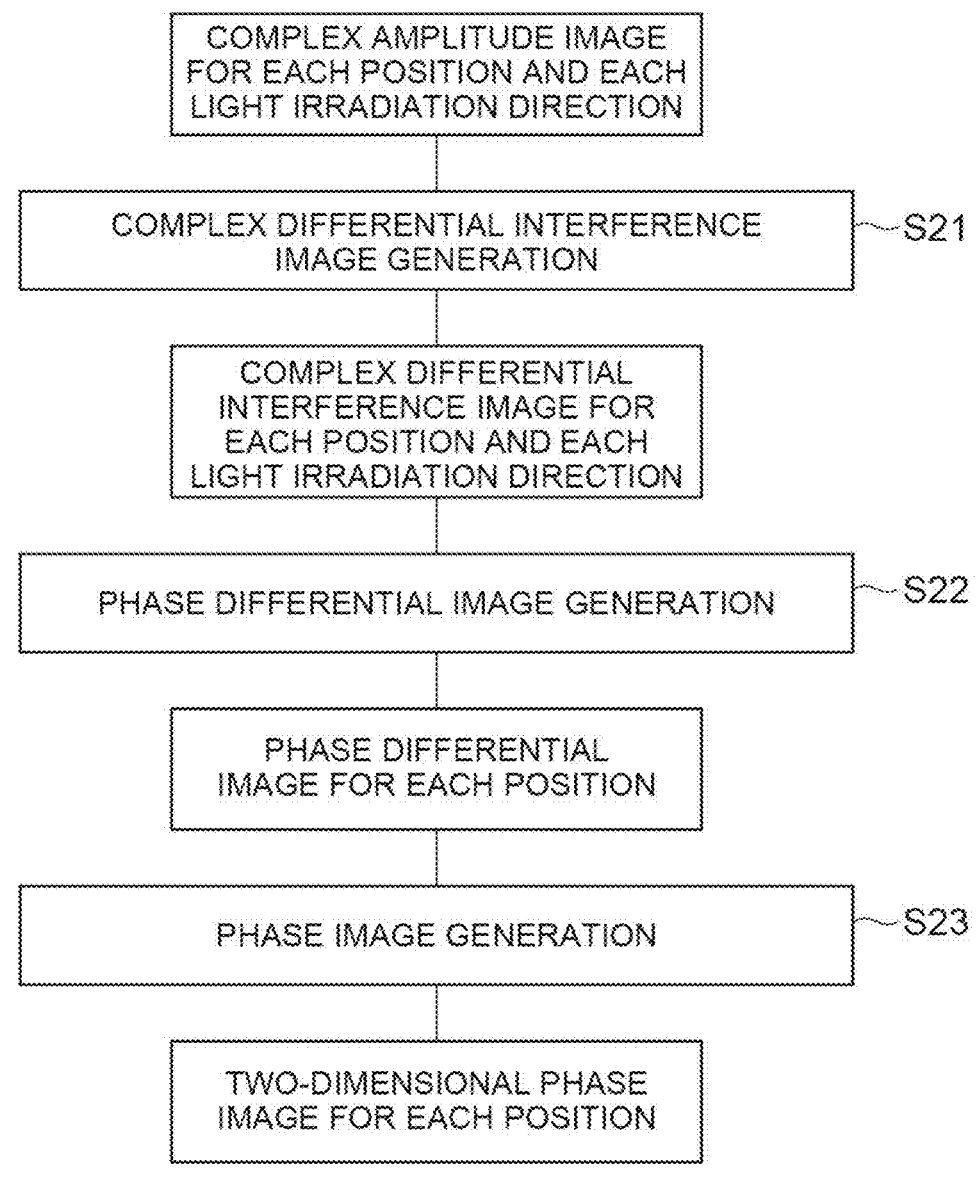
FIG. 13 is a flowchart of a second aspect of the two-dimensional phase image generation step S4.

FIG. 13 is a flowchart of a second aspect of the two-dimensional phase image generation step S4. In the second aspect, for each of the plurality of positions, the two-dimensional phase image generation step S4, in a step S21, generates a complex differential interference image of each of the plurality of light irradiation directions based on the complex amplitude image of each of the plurality of light irradiation directions, in a step S22, generates a phase differential image based on a summation of the complex differential interference images of the plurality of light irradiation directions, and in a step S23, generates the two-dimensional phase image based on the phase differential image.

Assuming that the complex amplitude image at the position of z=d is u(x, y, d), the complex differential interference image q(x, y, d) generated in the step S21 is represented by the following Formula (5). At least one of δx and δy is non-zero. When δx≠0 and δy=0, the complex differential interference image q in which the x direction is a shear direction is obtained. When δx=0 and δy≠0, the complex differential interference image q in which the y direction is the shear direction is obtained. When δx≠0 and δy≠0, the complex differential interference image q with the shear direction different from both of the x direction and the y direction is obtained.

[Formula 5]

$$q(x,y,d)=u^*(x+\delta x,y+\delta y,d)\cdot u(x,y,d) \qquad (5)$$

Assuming that the summation of the complex differential interference images q of the plurality of light irradiation directions is $q_{sum}(x, y, d)$, the phase differential image φ(x, y, z) generated in the step S22 is represented by the following Formula (6) as the phase of $q_{sum}(x, y, d)$. In the step S23, the two-dimensional phase image can be generated by performing integration or deconvolution of the phase differential image φ(x, y, z).

[Formula 6]

$$\phi(x,y,d)\angle q_{sum}(x,y,d) \qquad (6)$$

In addition, in the step S21, the complex differential interference image may be generated for each of a plurality of shear directions different from each other on the complex amplitude image. In this case, for each of the plurality of positions, the two-dimensional phase image generation step S4, in the step S21, generates the complex differential interference image of each of the plurality of light irradiation directions for each of the plurality of shear directions on the image different from each other based on the complex amplitude image of each of the plurality of light irradiation directions, in the step S22, generates the phase differential image based on the summation of the complex differential interference images of the plurality of light irradiation directions for each of the plurality of shear directions, and in the step S23, generates the two-dimensional phase image based on the phase differential image of each of the plurality of shear directions.

The influence of the multiple scattered light is reduced in the phase differential image generated based on the summation of the complex differential interference image of each of the plurality of light irradiation directions in the step S22. Further, the three-dimensional refractive index distribution obtained finally in the refractive index distribution calculation step S6 also reduces the influence of the multiple scattered light, and suppresses the speckles. Further, when the complex differential interference image is generated for each of the plurality of shear directions different from each other on the complex amplitude image in the step S21, it is possible to suppress the appearance of linear noises in the two-dimensional phase image obtained in the step S23.

Figure 14:
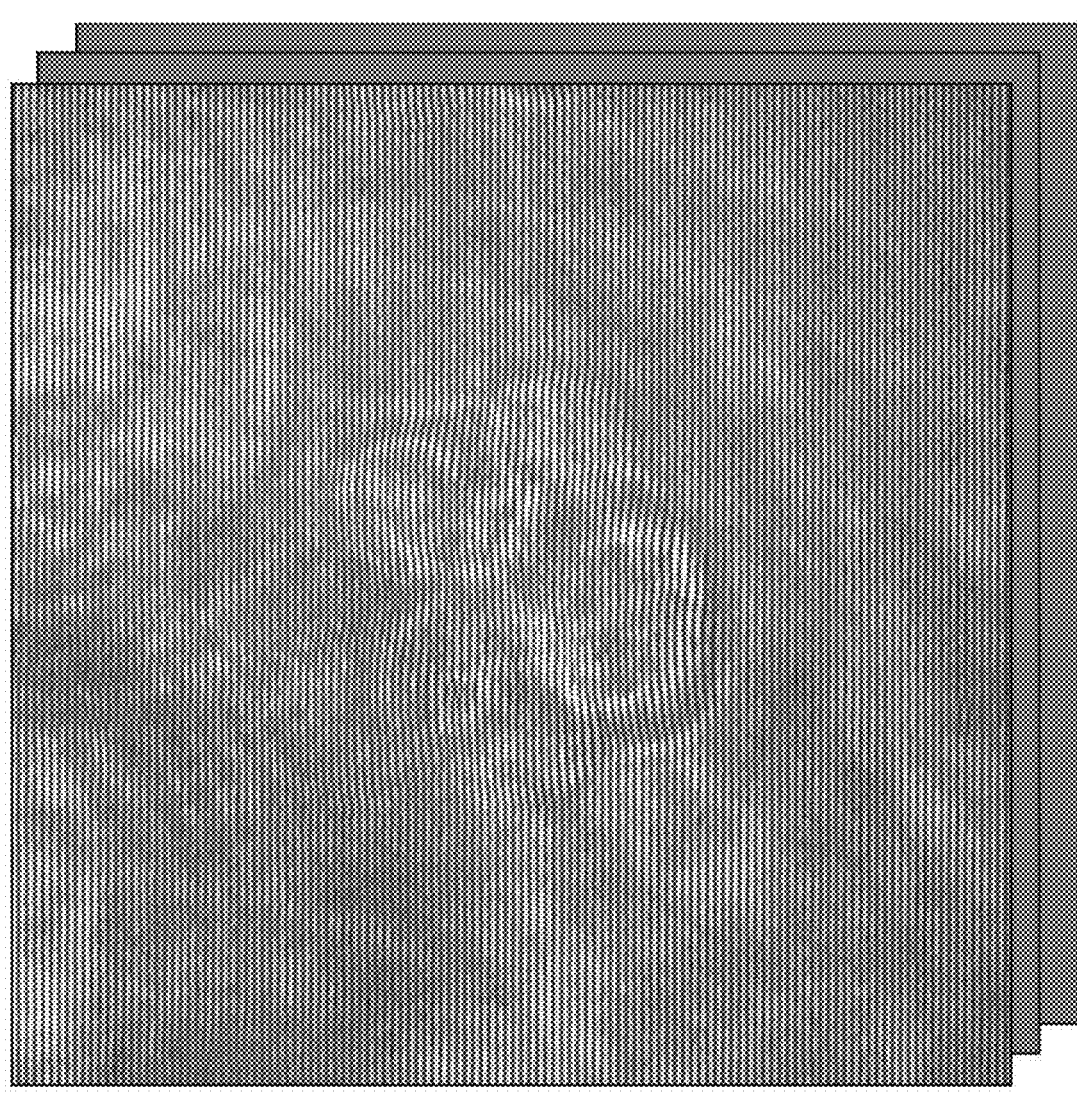
FIG. 14 is an interference intensity image (with vertical irradiation) acquired in the interference intensity image acquisition step S1.
Figure 15:
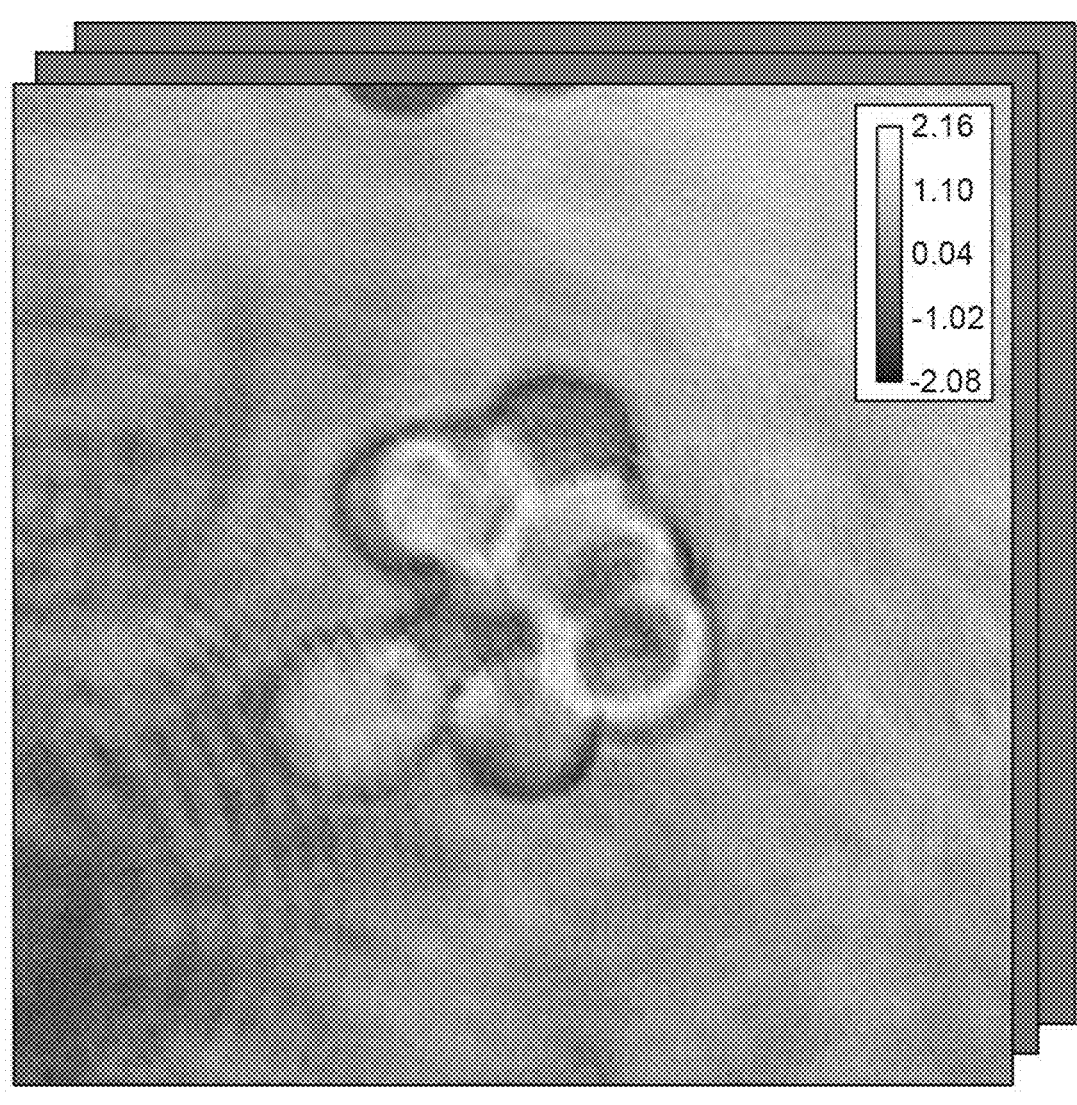
FIG. 15 is a complex amplitude image (real part, z=0) generated based on the interference intensity image (FIG. 14) in the first complex amplitude image generation step S2.
Figure 16:
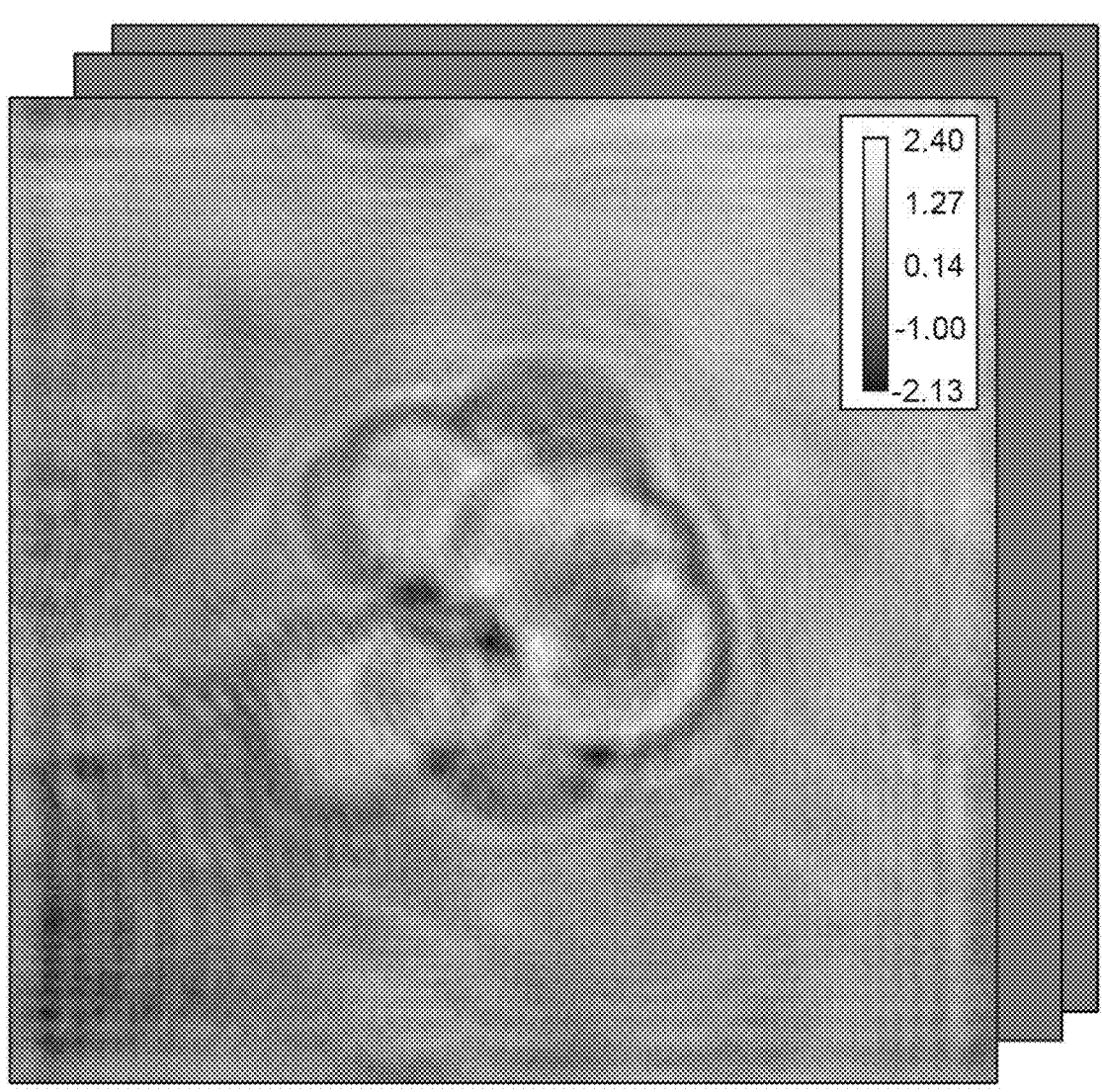
FIG. 16 is a complex amplitude image (real part, z=20 μm) generated based on the complex amplitude image (FIG. 15) in the second complex amplitude image generation step S3.

FIG. 14 to FIG. 21 are diagrams showing examples of the images obtained in the steps in the case of the second aspect of the two-dimensional phase image generation step S4. These images are based on the Fourier fringe analysis method using the observation apparatus 1A (FIG. 1). Further, in the step S21, the complex differential interference image is generated for each of the two shear directions (vertical direction shear and horizontal direction shear) different from each other on the complex amplitude image. FIG. 14 shows the interference intensity image (with vertical irradiation) acquired in the interference intensity image acquisition step S1. FIG. 15 shows the complex amplitude image (real part, $z=0$) generated based on the interference intensity image (FIG. 14) in the first complex amplitude image generation step S2. FIG. 16 shows the complex amplitude image (real part, $z=20\,\mu m$) generated based on the complex amplitude image (FIG. 15) in the second complex amplitude image generation step S3.

Figure 17:
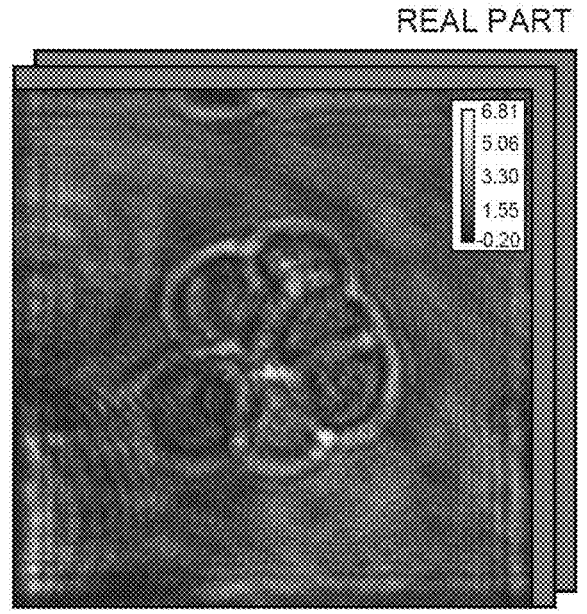
FIG. 17 includes complex differential interference images (real part and imaginary part respectively for vertical direction shear and horizontal direction shear) generated based on the complex amplitude image (FIG. 16) in a step S21 in the two-dimensional phase image generation step S4.
Figure 17:
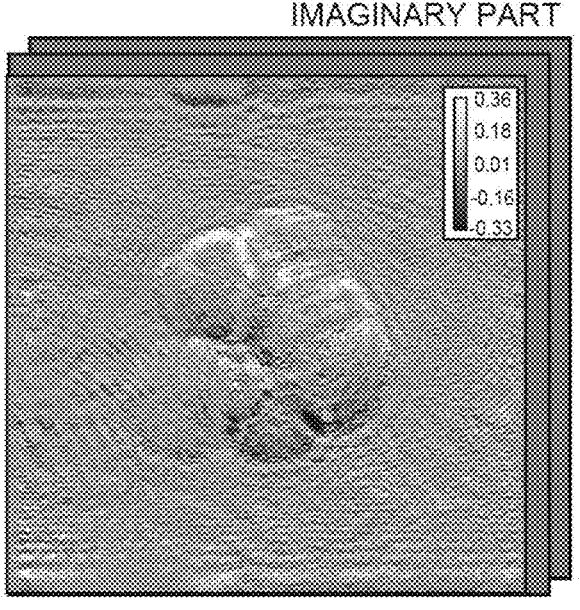
Figure 17:
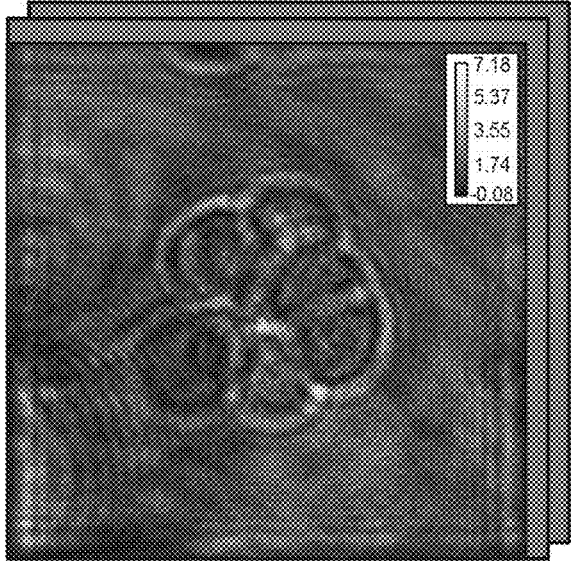
Figure 17:
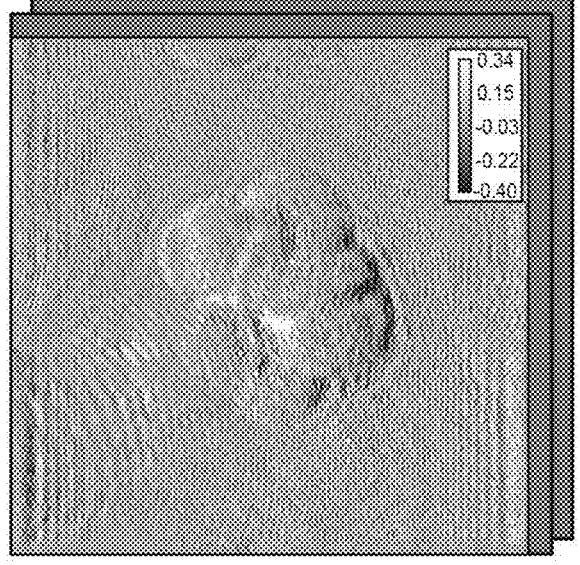
Figure 18:
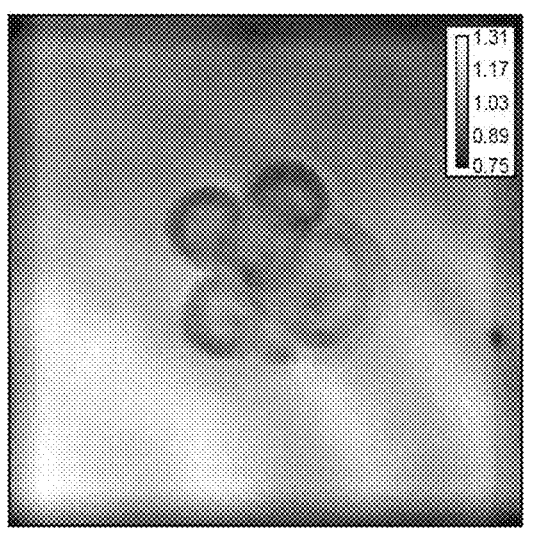
FIG. 18 includes images (real part and imaginary part respectively for vertical direction shear and horizontal direction shear) each representing a summation of the complex differential interference image (FIG. 17) generated in the step S21 in the two-dimensional phase image generation step S4.
Figure 18:
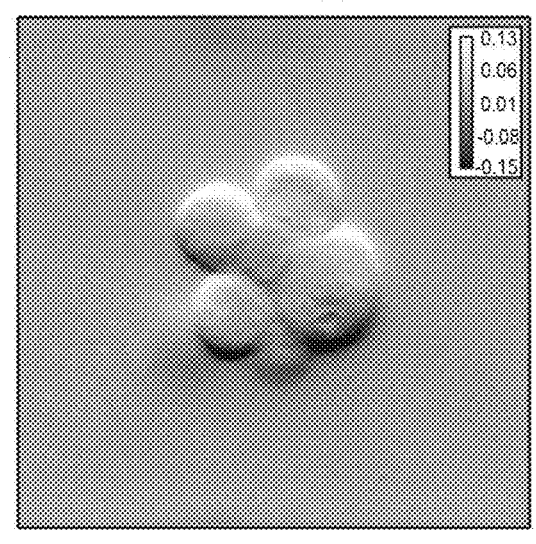
Figure 18:
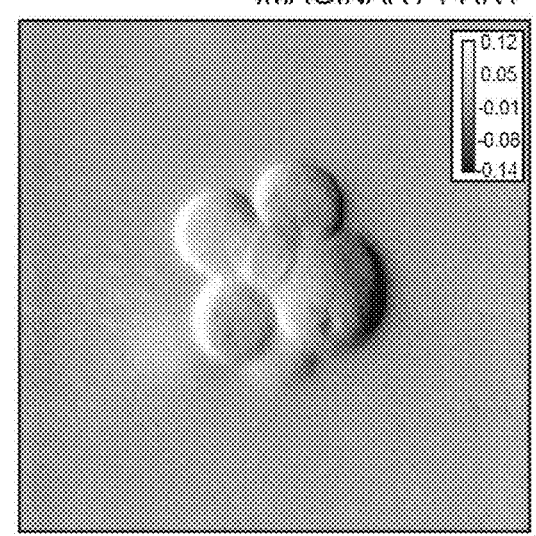
Figure 19:
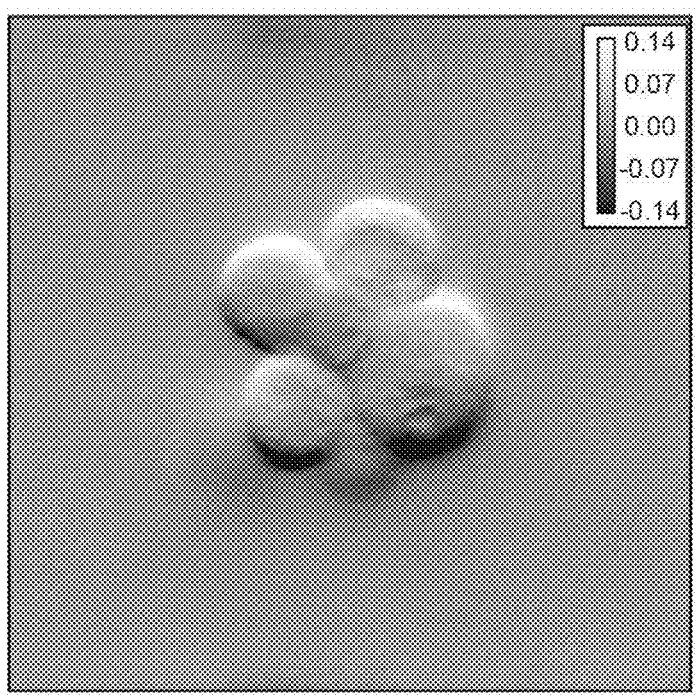
FIG. 19 includes phase differential images (vertical direction shear and horizontal direction shear) each generated based on the image (FIG. 18) representing the summation of the complex differential interference image in a step S22 in the two-dimensional phase image generation step S4.
Figure 19:
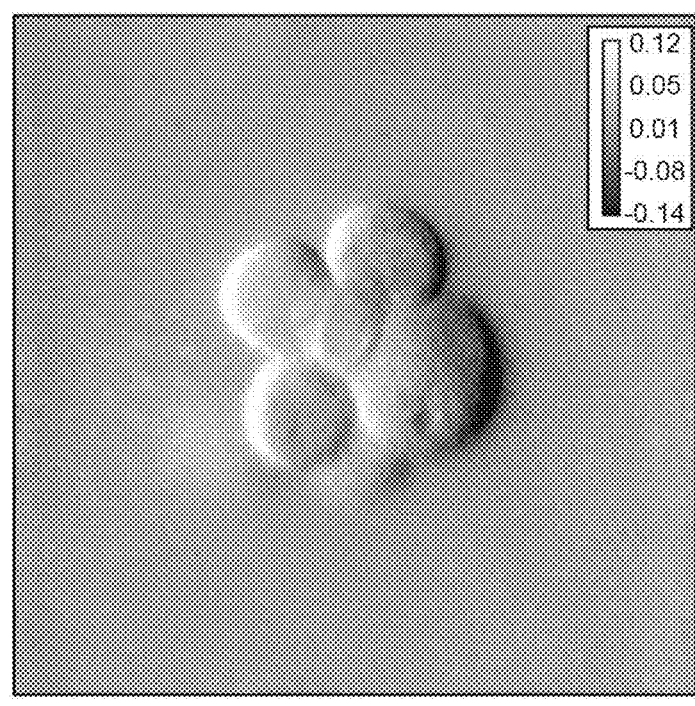
Figure 20:
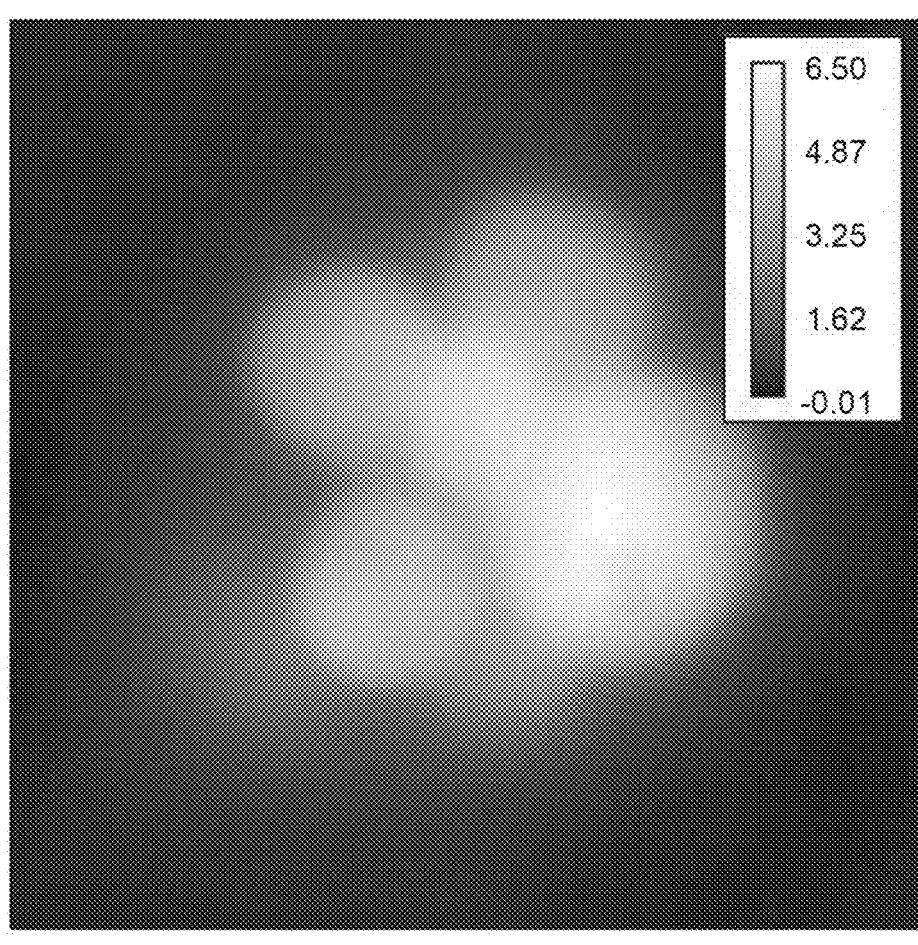
FIG. 20 is a two-dimensional phase image generated based on the phase differential image (FIG. 19) in a step S23 in the two-dimensional phase image generation step S4.
Figure 21:
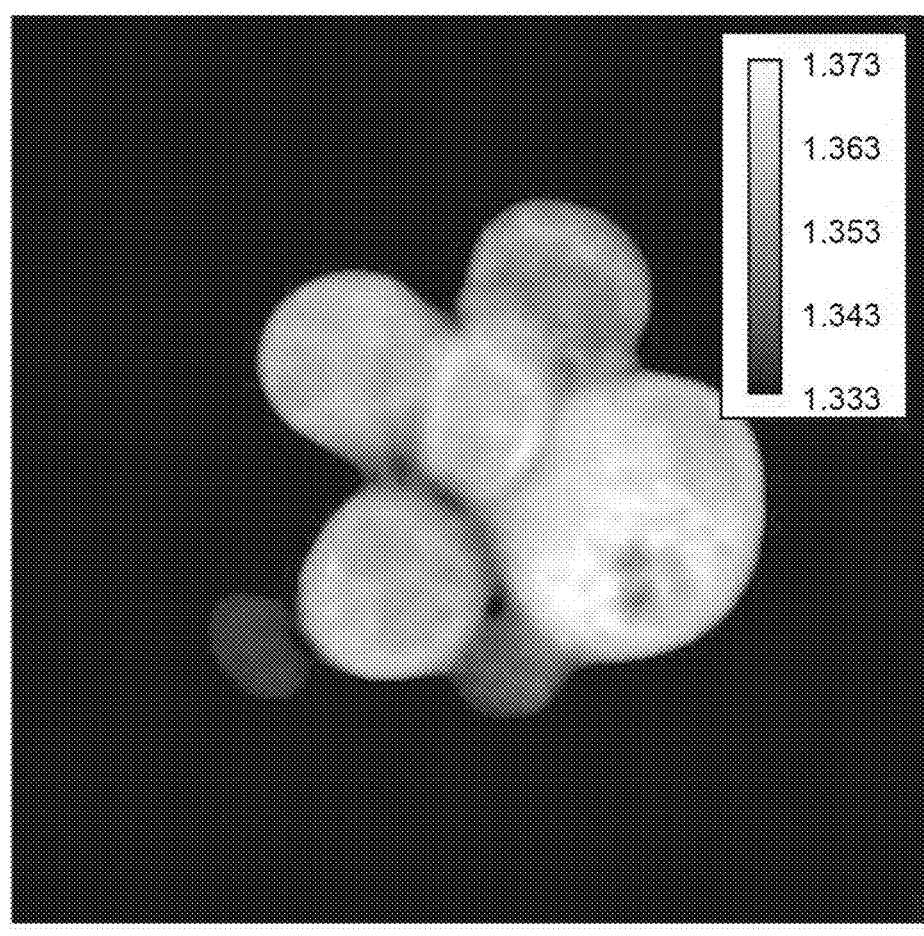
FIG. 21 is an image at a certain z position of a three-dimensional refractive index distribution obtained in the refractive index distribution calculation step S6.

FIG. 17 shows the complex differential interference images (real part and imaginary part for vertical direction shear and horizontal direction shear, respectively) generated based on the complex amplitude image (FIG. 16) in the step S21 in the two-dimensional phase image generation step S4. FIG. 18 shows the images (real part and imaginary part for vertical direction shear and horizontal direction shear, respectively) representing the summation of the complex differential interference image (FIG. 17) generated in the step S21 in the two-dimensional phase image generation step S4. FIG. 19 shows the phase differential images (vertical direction shear and horizontal direction shear) generated based on the image (FIG. 18) representing the summation of the complex differential interference image in the step S22 in the two-dimensional phase image generation step S4. FIG. 20 shows the two-dimensional phase image generated based on the phase differential image (FIG. 19) in the step S23 in the two-dimensional phase image generation step S4. FIG. 21 shows the image at a certain z position of the three-dimensional refractive index distribution obtained in the refractive index distribution calculation step S6. In this way, in the obtained three-dimensional refractive index distribution, the influence of the multiple scattered light is reduced, and the speckles are suppressed.

Figure 29:
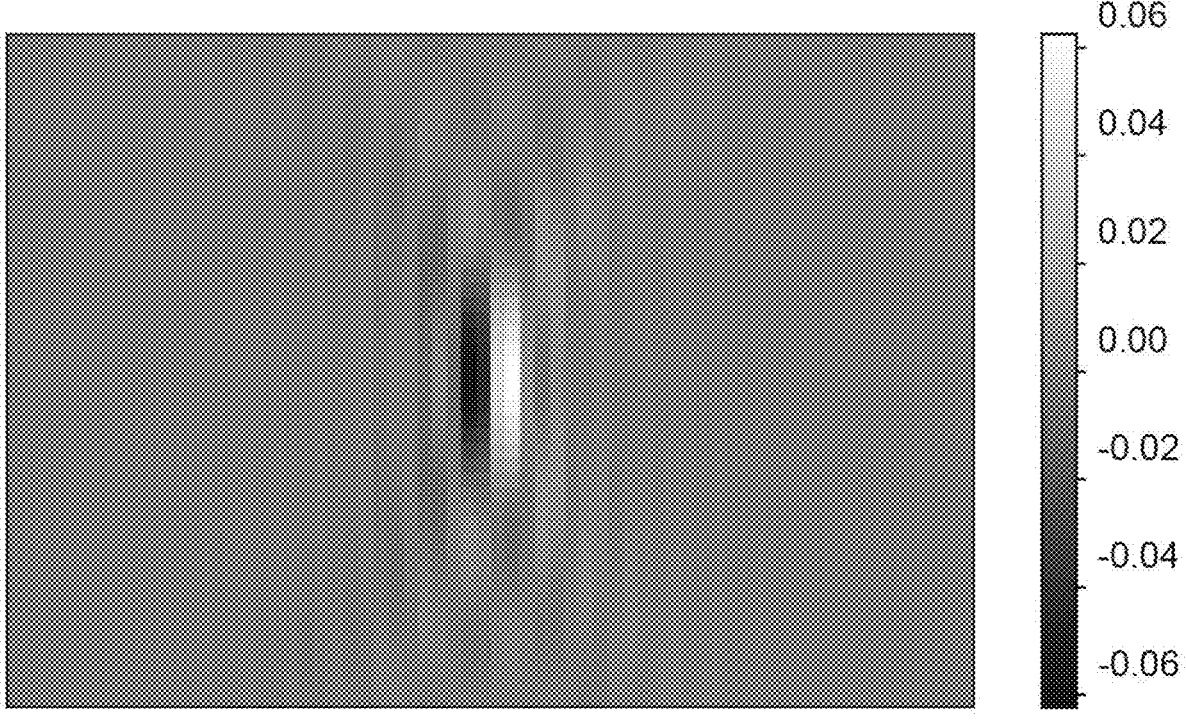
FIG. 29 is a diagram showing the kernel function.

In addition, in the above description, the case in which the two-dimensional phase image is generated by performing integration or deconvolution of the phase differential image in the step S23 is described. However, the phase differential image may also be treated as the two-dimensional phase image. In this case, the three-dimensional refractive index distribution of the observation object can be obtained from the phase differential image (two-dimensional phase image) generated in the step S22 by using a kernel (FIG. 29) including a kernel used in deconvolution of the step S23, in deconvolution of the refractive index distribution calculation step S6, without performing the step S23. The kernel shown in FIG. 29 is obtained by convolution integration of the kernel shown in FIG. 5 and the kernel used in deconvolution of the step S23.

Figure 22:
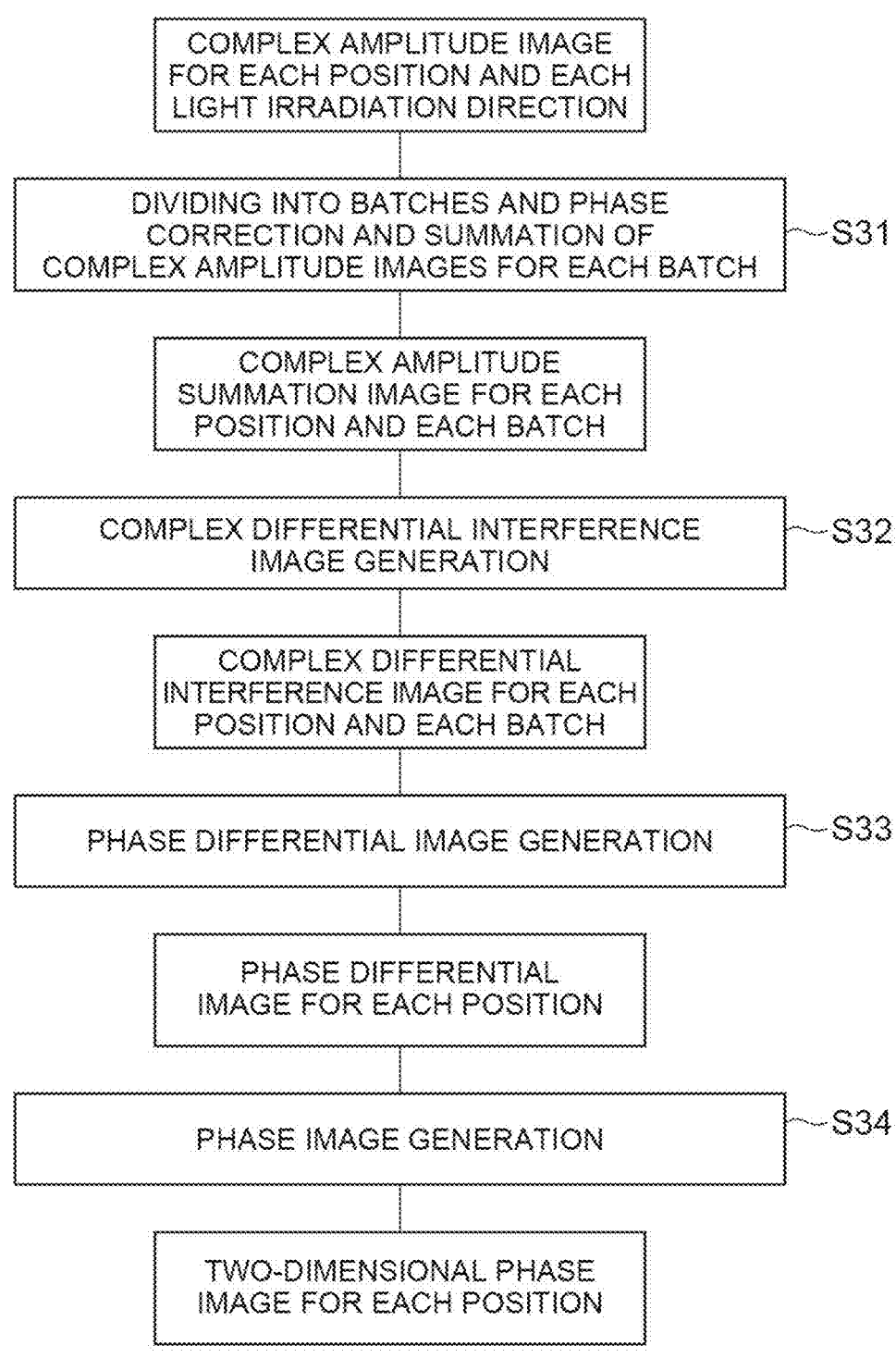
FIG. 22 is a flowchart of a third aspect of the two-dimensional phase image generation step S4.

FIG. 22 is a flowchart of a third aspect of the two-dimensional phase image generation step S4. In the third aspect, for each of the plurality of positions, the two-dimensional phase image generation step S4, in a step S31, divides the complex amplitude image of each of the plurality of light irradiation directions into a plurality of batches, corrects the phase of the complex amplitude image included in the batch based on the light irradiation direction for each of the plurality of batches, and then generates the complex amplitude summation image representing the summation of the complex amplitude images after the correction, in a step S32, generates the complex differential interference image of each of the plurality of batches based on the complex amplitude summation image of each of the plurality of batches, in a step S33, generates the phase differential image based on the summation of the complex differential interference images of the plurality of batches, and in a step S34, generates the two-dimensional phase image based on the phase differential image.

The processing of the step S31 in the third aspect corresponds to dividing the complex amplitude image of each of the plurality of light irradiation directions into the plurality of batches, and then performing the processing of the step S11 in the first aspect for each of the plurality of batches. The processing of the steps S32 and S33 in the third aspect corresponds to performing the processing of the steps S21 and S22 in the second aspect for each of the plurality of batches. The processing of the step S34 in the third aspect corresponds to performing the processing of the step S23 in the second aspect.

In addition, in the step S32, the complex differential interference image may be generated for each of the plurality of shear directions different from each other on the complex amplitude image. In this case, the two-dimensional phase image generation step S4, in the step S32, generates the complex differential interference image of each of the plurality of batches for each of the plurality of shear directions on the image different from each other based on the complex amplitude summation image of each of the plurality of batches, in the step S33, generates the phase differential image based on the summation of the complex differential interference images of the plurality of batches for each of the plurality of shear directions, and in the step S34, generates the two-dimensional phase image based on the phase differential image of each of the plurality of shear directions.

The suppression of the speckles in the third aspect is comparable with the first aspect and the second aspect. The improvement of the SMR in the third aspect is an intermediate degree between the first aspect and the second aspect.

Figure 23:
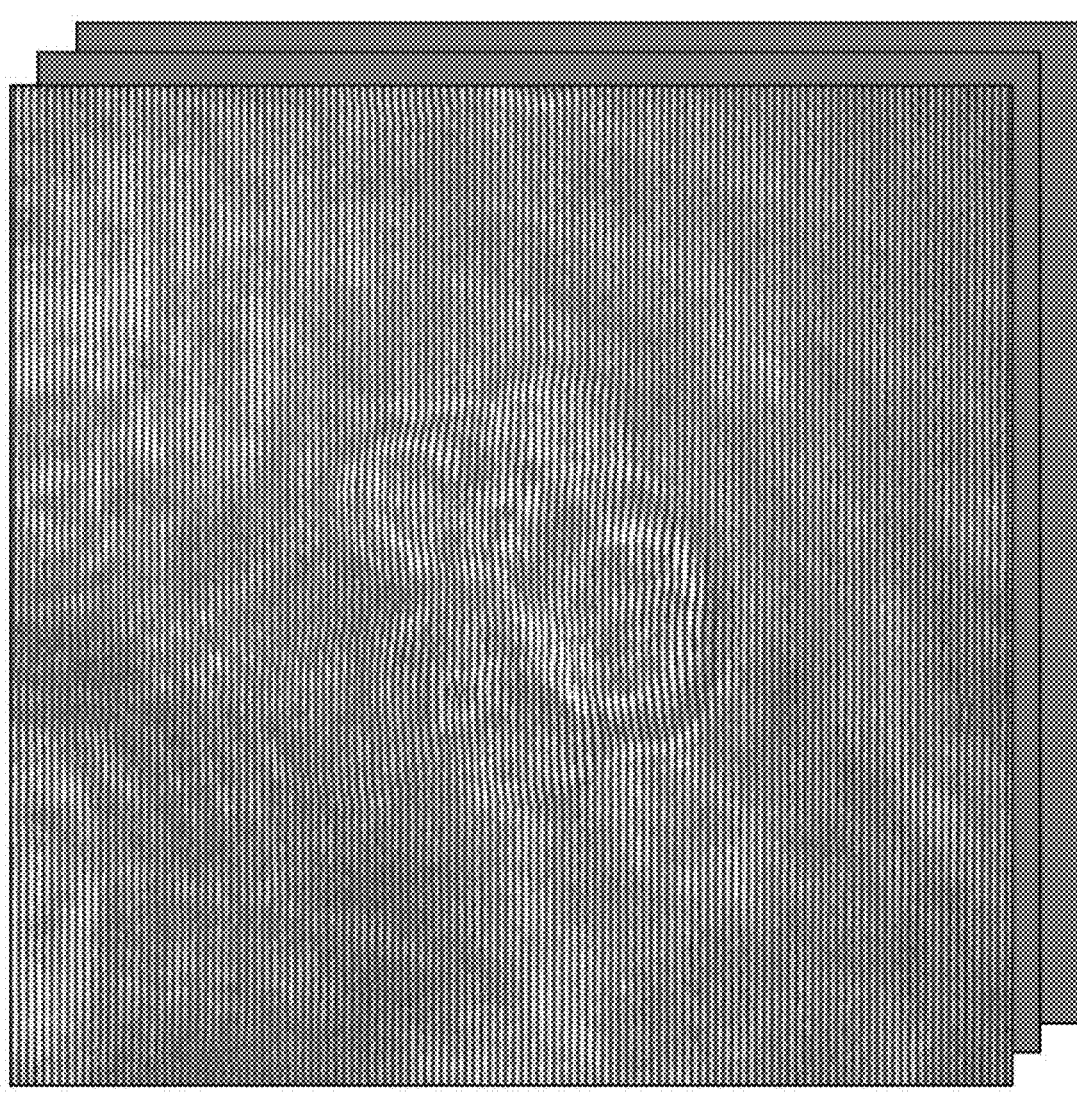
FIG. 23 is an interference intensity image (with vertical irradiation) acquired in the interference intensity image acquisition step S1.
Figure 24:
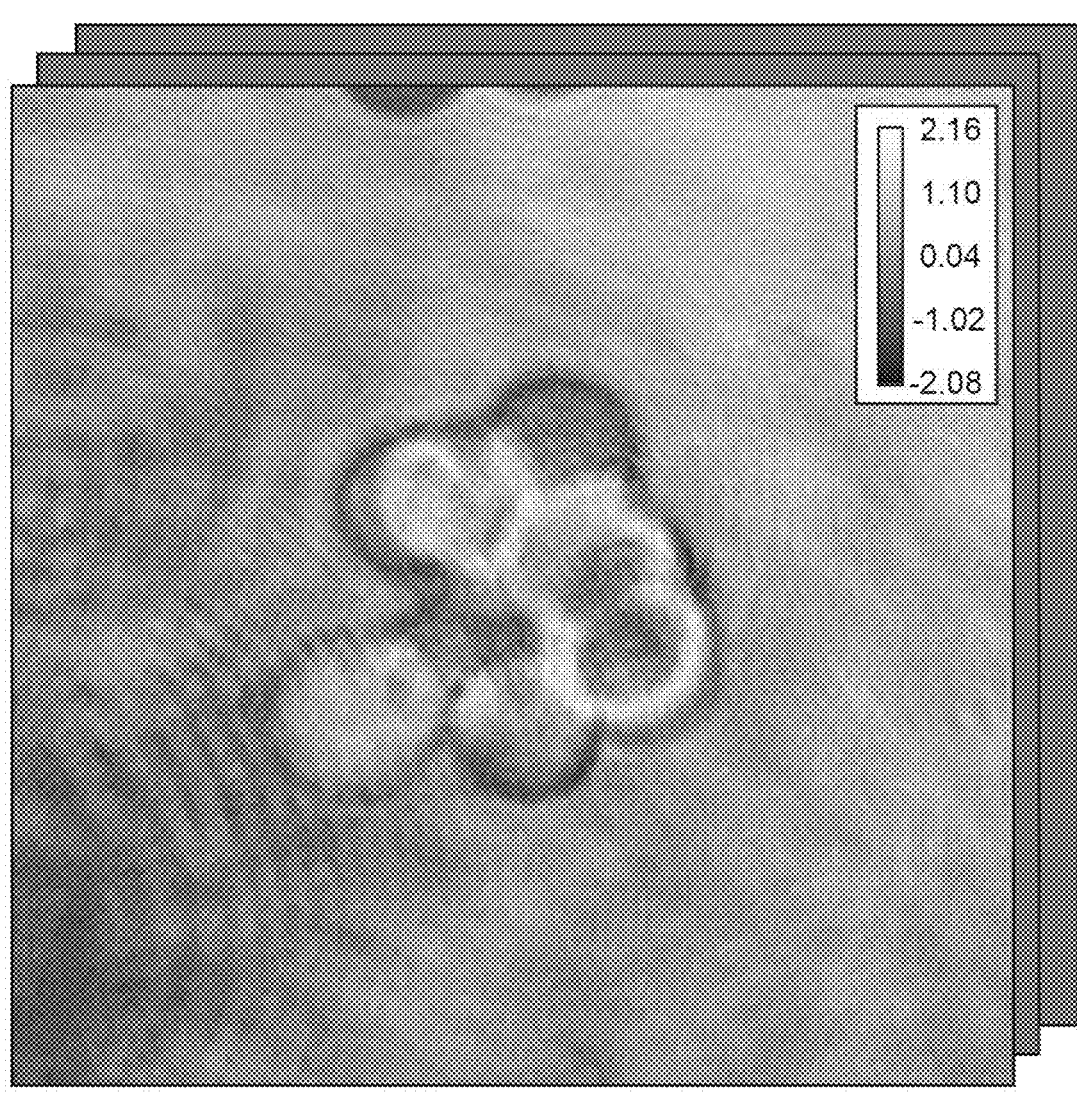
FIG. 24 is a complex amplitude image (real part, z=0) generated based on the interference intensity image (FIG. 23) in the first complex amplitude image generation step S2.

FIG. 23 to FIG. 28 are diagrams showing examples of the images obtained in the steps in the case of the third aspect of the two-dimensional phase image generation step S4. These images are based on the Fourier fringe analysis method using the observation apparatus 1A (FIG. 1). Further, in the step S32, the complex differential interference image is generated for each of the two shear directions (vertical direction shear and horizontal direction shear) different from each other on the complex amplitude image. FIG. 23 shows the interference intensity image (with vertical irradiation) acquired in the interference intensity image acquisition step S1. FIG. 24 shows the complex amplitude image (real part, $z=0$) generated based on the interference intensity image (FIG. 23) in the first complex amplitude image generation step S2.

Figure 25:
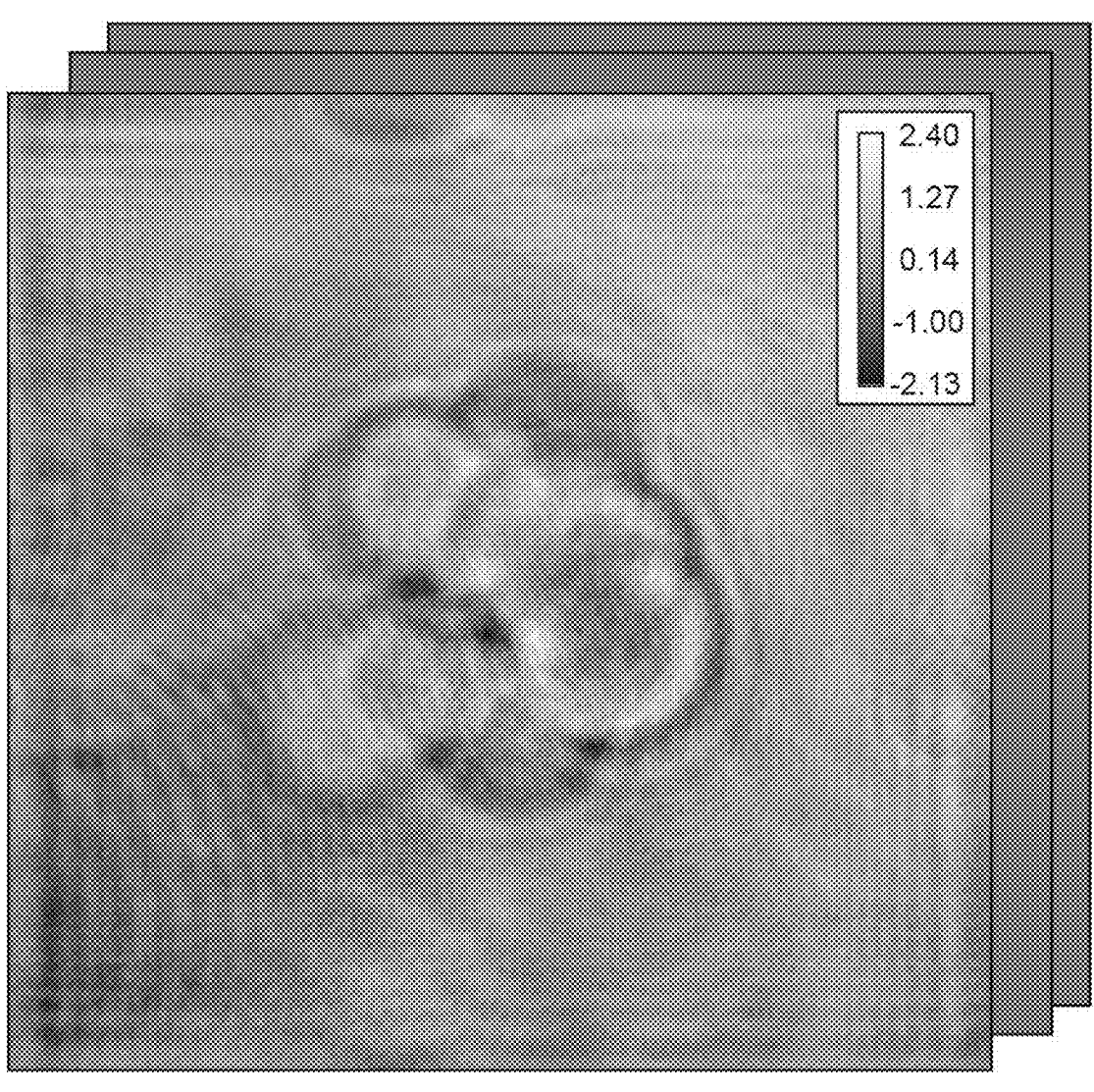
FIG. 25 is a complex amplitude image (real part, z=20 μm) generated based on the complex amplitude image (FIG. 24) in the second complex amplitude image generation step S3.
Figure 26:
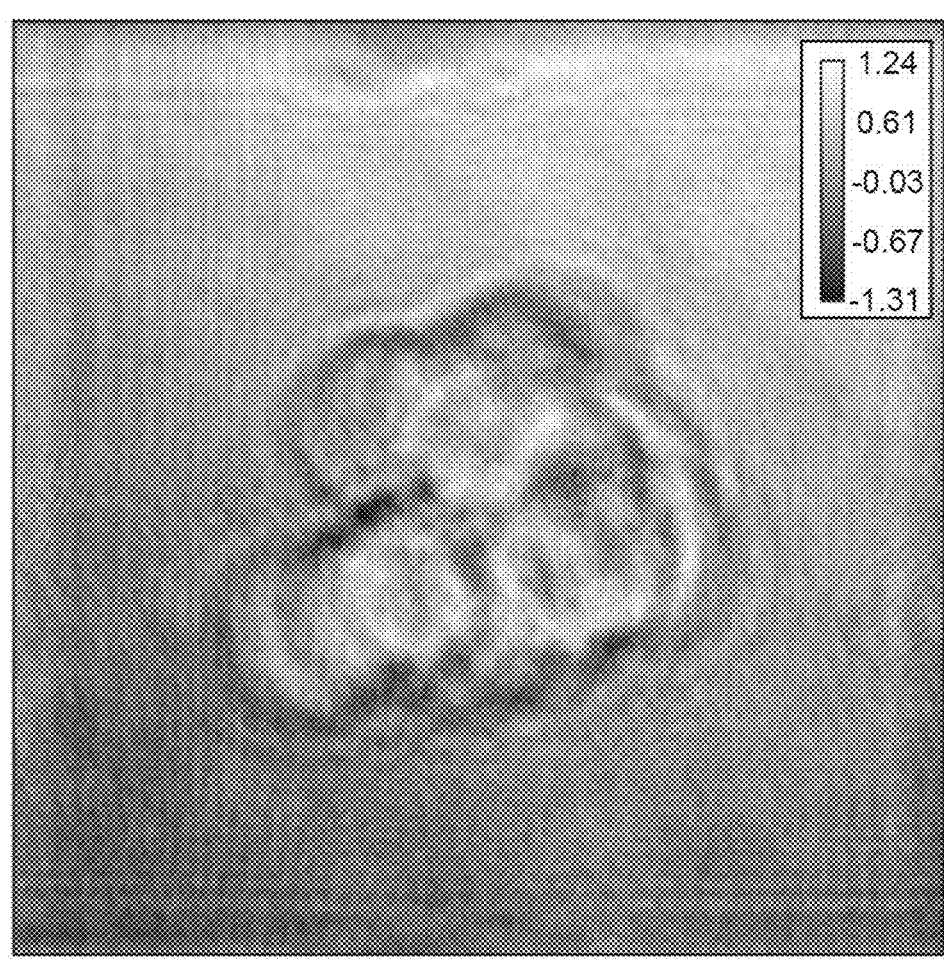
FIG. 26 is a complex amplitude summation image generated based on the complex amplitude image (FIG. 25) in a step S31 in the two-dimensional phase image generation step S4.
Figure 27:
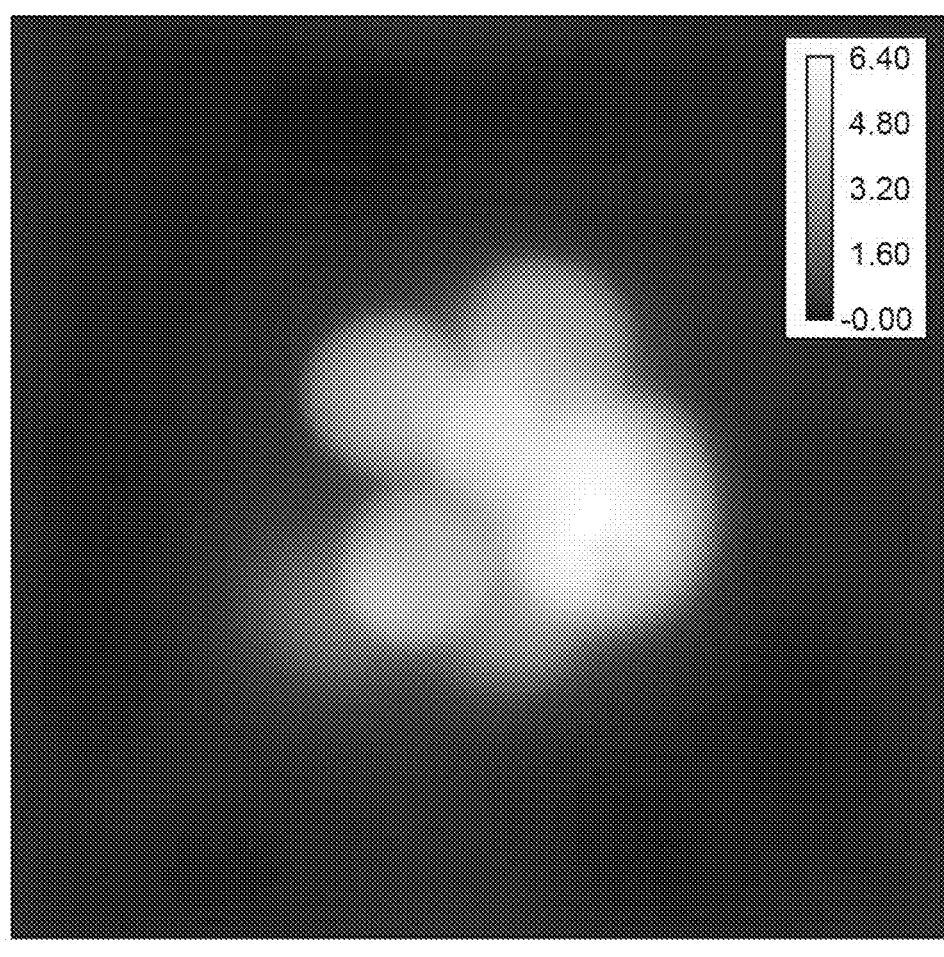
FIG. 27 is a two-dimensional phase image generated in a step S34 in the two-dimensional phase image generation step S4.
Figure 28:
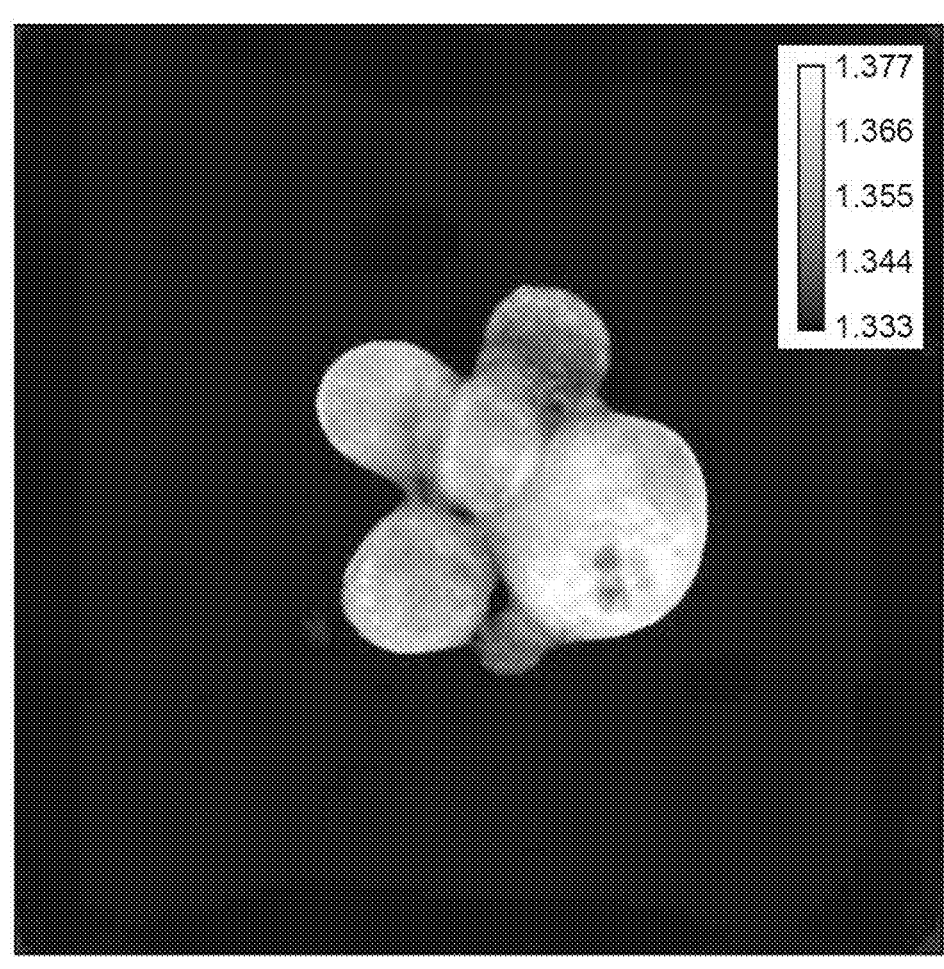
FIG. 28 is an image at a certain z position of a three-dimensional refractive index distribution obtained in the refractive index distribution calculation step S6.

FIG. 25 shows the complex amplitude image (real part, $z=20\,\mu m$) generated based on the complex amplitude image (FIG. 24) in the second complex amplitude image generation step S3. FIG. 26 shows the complex amplitude summation image generated based on the complex amplitude image (FIG. 25) in the step S31 in the two-dimensional phase image generation step S4. FIG. 27 shows the two-dimensional phase image generated in the step S34 in the two-dimensional phase image generation step S4. FIG. 28 shows the image at a certain z position of the three-dimensional refractive index distribution obtained in the refractive index distribution calculation step S6. In this way, in the obtained three-dimensional refractive index distribution, the influence of the multiple scattered light is reduced, the speckles are suppressed, and the SMR is improved.

In addition, in the above description, the case in which the two-dimensional phase image is generated by performing integration or deconvolution of the phase differential image in the step S34 is described. However, the phase differential image may also be treated as the two-dimensional phase image. In this case, the three-dimensional refractive index distribution of the observation object can be obtained from the phase differential image (two-dimensional phase image) generated in the step S33 by using the kernel including the kernel used in deconvolution of the step S34, in deconvolution of the refractive index distribution calculation step S6, without performing the step S34.

When the image at the certain z position in the three-dimensional refractive index distribution obtained in the first aspect (FIG. 12), the image at the certain z position in the three-dimensional refractive index distribution obtained in the second aspect (FIG. 21), and the image at the certain z position in the three-dimensional refractive index distribution obtained in the third aspect (FIG. 28) are compared, the effect of speckle suppression is comparable, but the effect of SMR improvement is larger in the third aspect than in the second aspect, and the effect of SMR improvement is larger in the first aspect than in the third aspect.

In addition, when calculating the phase in the present embodiment, it is preferable to perform phase unwrapping as necessary.

The observation apparatus is not limited to the embodiments and configuration examples described above, and various modifications are possible. In the configuration of the observation apparatus 1A (FIG. 1) and the observation apparatus 1B (FIG. 2), the light transmitted through the observation object S is the object light, and the light reflected by the observation object S may be the object light as in a configuration of an observation apparatus 1C (FIG. 30) described below.

Figure 30:
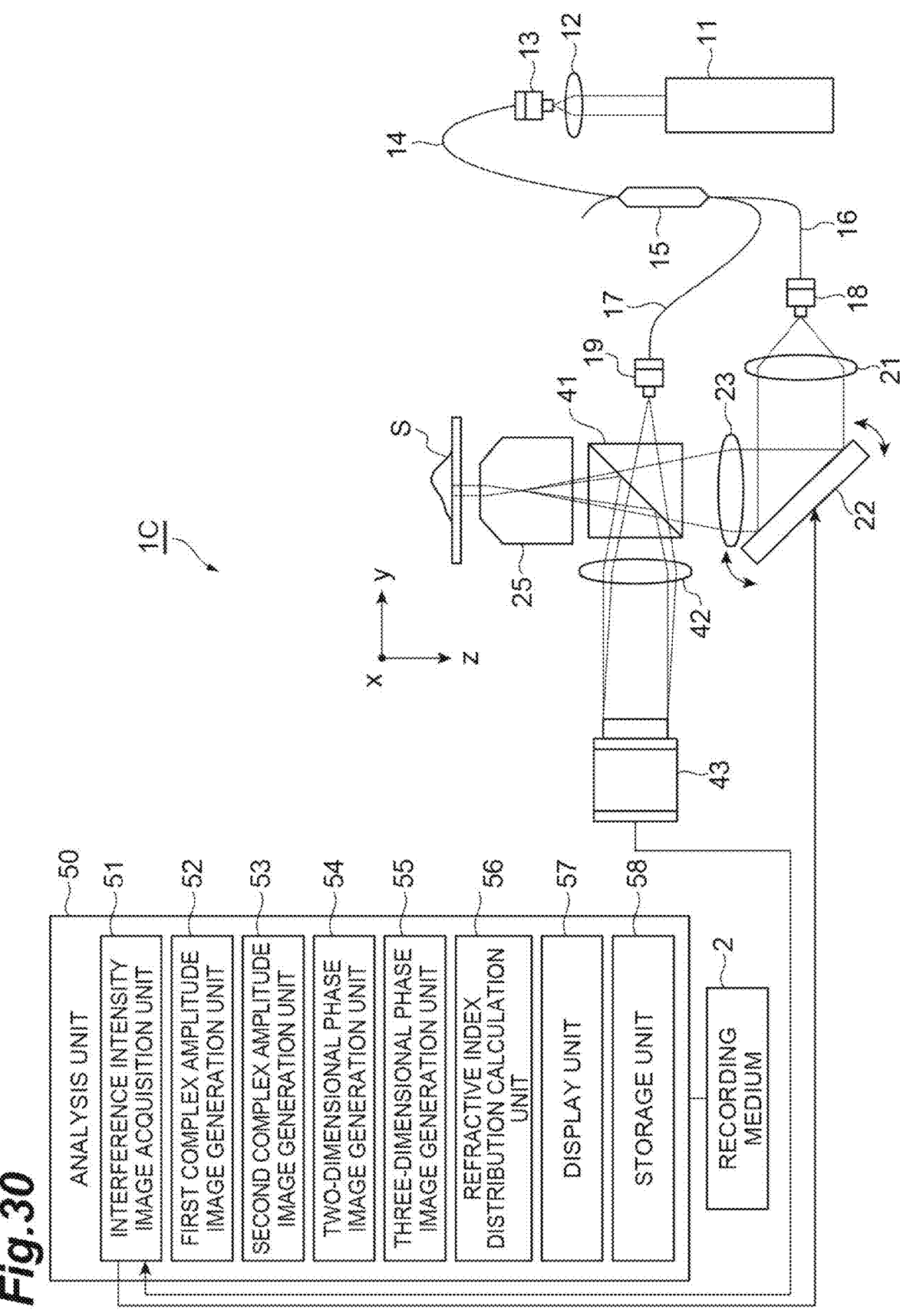
FIG. 30 is a diagram illustrating a configuration of an observation apparatus 1C.

FIG. 30 is a diagram illustrating a configuration of an observation apparatus 1C. The observation apparatus 1C includes the light source 11, the lens 12, the lens 21, the mirror 22, the lens 23, the objective lens 25, the beam splitter 41, the lens 42, the imaging unit 43, and the analysis unit 50. Hereinafter, differences from the observation apparatus 1A (FIG. 1) will be mainly described.

The lens 21 is optically coupled to the light output end 18 of the optical fiber 16, and collimates the light output as diverging light from the light output end 18. The mirror 22 is optically coupled to the lens 21, and reflects the light arriving from the lens 21 to the lens 23. The orientation of the reflection surface of the mirror 22 is changeable. The lens 23 is optically coupled to the mirror 22. The objective lens 25 is optically coupled to the lens 23. The beam splitter 41 is disposed between the lens 23 and the objective lens 25. The lens 23 and the objective lens 25 preferably constitute a 4f optical system. The lens 23 and the objective lens 25 irradiate the observation object S with the light from the light irradiation direction according to the orientation of the reflection surface of the mirror 22. The objective lens 25 inputs the light (object light) reflected from the observation object S, and outputs the light to the beam splitter 41.

The beam splitter 41 is optically coupled to the objective lens 25, and further, is optically coupled also to the light output end 19 of the optical fiber 17. The beam splitter 41 combines the light (object light) output and arriving from the objective lens 25 and the light (reference light) output and arriving from the light output end 19, and outputs the light to the lens 42. The lens 42 is optically coupled to the beam splitter 41, collimates the object light and the reference light arriving from the beam splitter 41, and outputs the light to the imaging unit 43. The imaging unit 43 is optically coupled to the lens 42, and images the interference fringe image (interference intensity image) generated by interference between the object light and the reference light arriving from the lens 42. The incident direction of the reference light is inclined with respect to the incident direction of the object light on the imaging plane of the imaging unit 43. The position at which the object light and the reference light are combined by the beam splitter 41 may be in the subsequent stage of the imaging lens, and in addition, in consideration of the influence of aberration, it is desirable that the position is set between the objective lens 25 and the lens 42 as illustrated in the diagram.

In the configuration of the observation apparatus 1C (FIG. 30), as in the observation apparatus 1B (FIG. 2), the mechanism (the lens 31, the mirror 32, the drive unit 33, and the lens 34 in FIG. 2) for changing the optical path length of the reference light may be provided for changing the optical path difference (phase difference) of the object light and the reference light from light splitting by the fiber coupler 15 to combining by the beam splitter 41. In this case, the incident direction of the reference light may be parallel to the incident direction of the object light on the imaging plane of the imaging unit 43.

Figure 31:
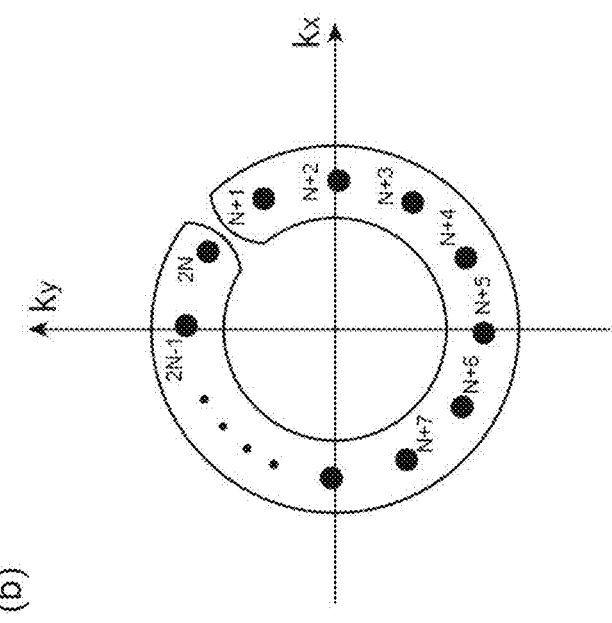
FIG. 31 includes (a), (b) diagrams illustrating an example of the scanning of the light irradiation direction on the observation object S in the interference intensity image acquisition step S1.
Figure 31:
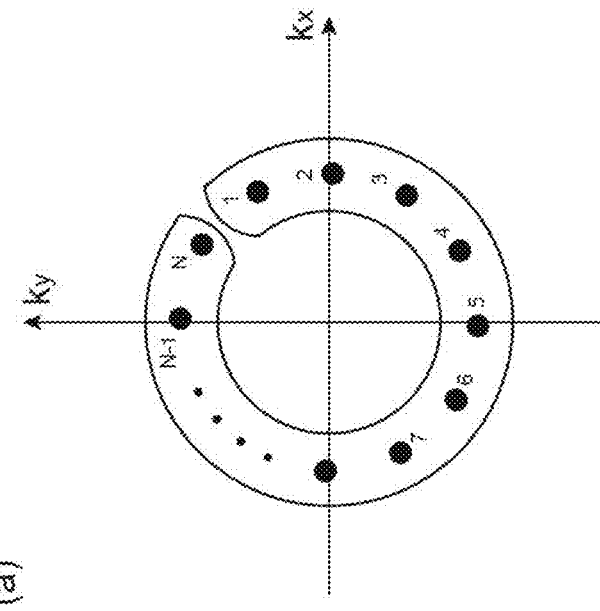
Figure 32:
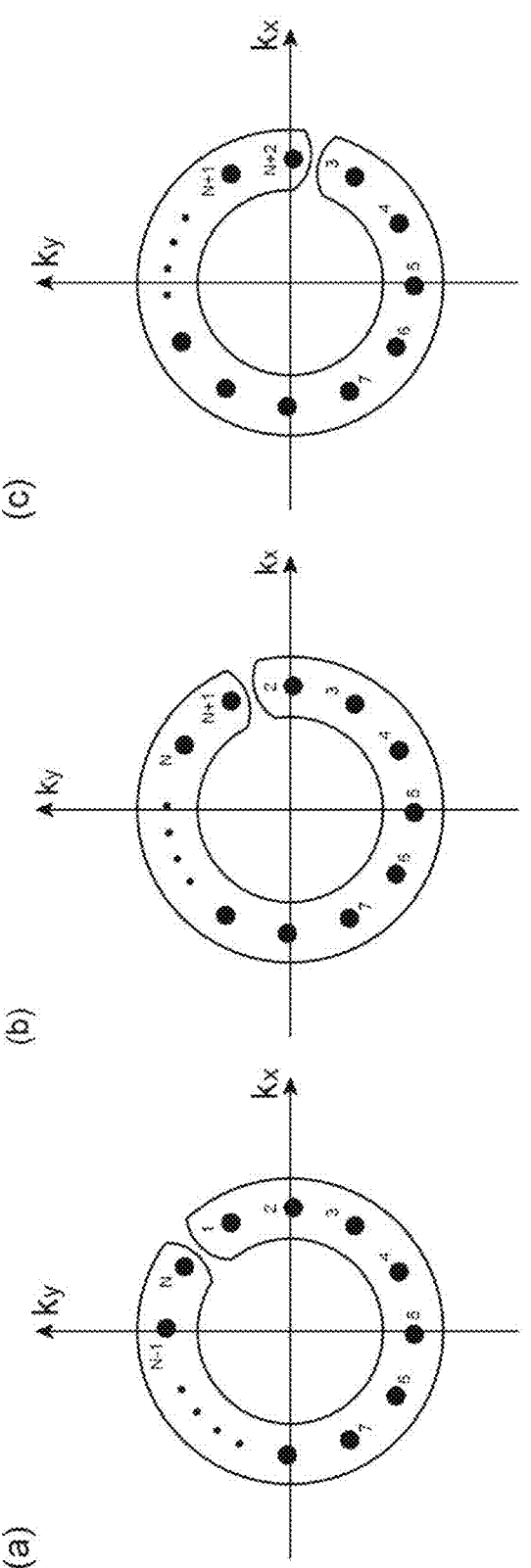
FIG. 32 includes (a)-(c) diagrams illustrating an example of the scanning of the light irradiation direction on the observation object S in the interference intensity image acquisition step S1.

Further, the processing of the first complex amplitude image generation step S2, the second complex amplitude image generation step S3, the two-dimensional phase image generation step S4, the three-dimensional phase image generation step S5, and the refractive index distribution calculation step S6 may be performed each time the interference intensity images of a predetermined number of light irradiation directions are acquired in the interference intensity image acquisition step S1 (FIG. 31), or may be performed each time the interference intensity image of one light irradiation direction is acquired in the interference intensity image acquisition step S1 (FIG. 32).

FIG. 31 and FIG. 32 include diagrams illustrating examples of scanning of the light irradiation direction on the observation object S in the interference intensity image acquisition step S1. In the diagram, the position of each circular point represents the light irradiation direction in the $k_x k_y$ plane in which the horizontal axis is set to $k_x$ and the vertical axis is set to $k_y$. In the examples of the scanning of the light irradiation direction illustrated in these diagrams, the light irradiation direction is sequentially changed, and the light irradiation direction at the time of acquiring the (N+n)-th interference intensity image coincides with the light irradiation direction at the time of acquiring the n-th interference intensity image. n is a positive integer, and N is an integer of 2 or more.

In the example illustrated in FIG. 31, when the first to N-th interference intensity images are acquired in the interference intensity image acquisition step S1, the processing of the steps S2 to S6 is performed based on the first to N-th interference intensity images ((a) in FIG. 31). Next, when the (N+1)-th to 2N-th interference intensity images are acquired in the interference intensity image acquisition step S1, the processing of the steps S2 to S6 is performed based on the (N+1)-th to 2N-th interference intensity images ((b) in FIG. 31). Next, when the (2N+1)-th to 3N-th interference intensity images are acquired in the interference intensity image acquisition step S1, the processing of the steps S2 to S6 is performed based on the (2N+1)-th to 3N-th interference intensity images. The same applies hereinafter.

In the example illustrated in FIG. 32, when the first to N-th interference intensity images are acquired in the interference intensity image acquisition step S1, the processing of the steps S2 to S6 is performed based on the first to N-th interference intensity images ((a) in FIG. 32). Next, when the (N+1)-th interference intensity image is acquired in the interference intensity image acquisition step S1, the processing of the steps S2 to S6 is performed based on the latest N interference intensity images (second to (N+1)-th interference intensity images) including the (N+1)-th interference intensity image ((b) in FIG. 32). Next, when the (N+2)-th interference intensity image is acquired in the interference intensity image acquisition step S1, the processing of the steps S2 to S6 is performed based on the latest N interference intensity images (third to (N+2)-th interference intensity images) including the (N+2)-th interference intensity image ((c) in FIG. 32). The same applies hereinafter, and when the (N+n)-th interference intensity image is acquired in the interference intensity image acquisition step S1, the processing of the steps S2 to S6 is performed based on the latest N interference intensity images ((1+n)-th to (N+n)-th interference intensity images) including the (N+n)-th interference intensity image.

As compared with the example illustrated in FIG. 31, in the example illustrated in FIG. 32, each time the interference intensity image of the one light irradiation direction is acquired in the interference intensity image acquisition step S1, the processing of the steps S2 to S6 is performed based on the plurality of latest interference intensity images including the acquired interference intensity image, and thus, the number of images obtained per unit time by the processing of the steps S2 to S6 is large.

The observation apparatus of the above embodiment includes (1) an interference intensity image acquisition unit for acquiring, for each of a plurality of light irradiation directions, an interference intensity image at a reference position generated by interference between light irradiating an observation object along each of the plurality of light irradiation directions and passed through the observation object and reference light; (2) a first complex amplitude image generation unit for generating a complex amplitude image at the reference position based on the interference intensity image at the reference position for each of the plurality of light irradiation directions; and (3) a two-dimensional phase image generation unit for generating a two-dimensional phase image based on the complex amplitude image of each of the plurality of light irradiation directions.

In one aspect, the two-dimensional phase image generation unit is configured to (a) correct a phase of the complex amplitude image of each of the plurality of light irradiation directions based on the light irradiation direction, and then generate a complex amplitude summation image representing a summation of the complex amplitude images after correction, and (b) generate the two-dimensional phase image based on the complex amplitude summation image.

In another aspect, the two-dimensional phase image generation unit is configured to (a) generate a complex differential interference image of each of the plurality of light irradiation directions based on the complex amplitude image of each of the plurality of light irradiation directions, and (b) generate the two-dimensional phase image based on the complex differential interference image of each of the plurality of light irradiation directions. Further, the two-dimensional phase image generation unit may be configured to (a) generate the complex differential interference image of each of the plurality of light irradiation directions based on the complex amplitude image of each of the plurality of light irradiation directions for each of a plurality of shear directions on the image different from each other, and (b) generate the two-dimensional phase image based on the complex differential interference image of each of the plurality of shear directions and the plurality of light irradiation directions.

In still another aspect, the two-dimensional phase image generation unit is configured to (a) divide the complex amplitude image of each of the plurality of light irradiation directions into a plurality of batches, correct a phase of the complex amplitude image included in the batch based on the light irradiation direction for each of the plurality of batches, and then generate a complex amplitude summation image representing a summation of the complex amplitude images after correction, (b) generate a complex differential interference image of each of the plurality of batches based on the complex amplitude summation image of each of the plurality of batches, and (c) generate the two-dimensional phase image based on the complex differential interference image of each of the plurality of batches. Further, the two-dimensional phase image generation unit may be configured to (a) divide the complex amplitude image of each of the plurality of light irradiation directions into the plurality of batches, correct the phase of the complex amplitude image included in the batch based on the light irradiation direction for each of the plurality of batches, and then generate the complex amplitude summation image representing the summation of the complex amplitude images after correction, (b) generate the complex differential interference image of each of the plurality of batches based on the complex amplitude summation image of each of the plurality of batches for each of a plurality of shear directions on the image different from each other, and (c) generate the two-dimensional phase image based on the complex differential interference image of each of the plurality of shear directions and the plurality of batches.

Further, in one aspect, the observation apparatus may further include (4) a second complex amplitude image generation unit for generating, for each of the plurality of light irradiation directions, a complex amplitude image at each of a plurality of positions based on the complex amplitude image at the reference position generated by the first complex amplitude image generation unit; (5) a three-dimensional phase image generation unit for generating a three-dimensional phase image based on the two-dimensional phase image at each of the plurality of positions generated by the two-dimensional phase image generation unit; and (6) a refractive index distribution calculation unit for obtaining a three-dimensional refractive index distribution of the observation object based on the three-dimensional phase image.

The observation method of the above embodiment includes (1) an interference intensity image acquisition step of acquiring, for each of a plurality of light irradiation directions, an interference intensity image at a reference position generated by interference between light irradiating an observation object along each of the plurality of light irradiation directions and passed through the observation object and reference light; (2) a first complex amplitude image generation step of generating a complex amplitude image at the reference position based on the interference intensity image at the reference position for each of the plurality of light irradiation directions; and (3) a two-dimensional phase image generation step of generating a two-dimensional phase image based on the complex amplitude image of each of the plurality of light irradiation directions.

In one aspect, the two-dimensional phase image generation step includes (a) correcting a phase of the complex amplitude image of each of the plurality of light irradiation directions based on the light irradiation direction, and then generating a complex amplitude summation image representing a summation of the complex amplitude images after correction, and (b) generating the two-dimensional phase image based on the complex amplitude summation image.

In another aspect, the two-dimensional phase image generation step includes (a) generating a complex differential interference image of each of the plurality of light irradiation directions based on the complex amplitude image of each of the plurality of light irradiation directions, and (b) generating the two-dimensional phase image based on the complex differential interference image of each of the plurality of light irradiation directions. Further, the two-dimensional phase image generation step may include (a) generating the complex differential interference image of each of the plurality of light irradiation directions based on the complex amplitude image of each of the plurality of light irradiation directions for each of a plurality of shear directions on the image different from each other, and (b) generating the two-dimensional phase image based on the complex differential interference image of each of the plurality of shear directions and the plurality of light irradiation directions.

In still another aspect, the two-dimensional phase image generation step includes (a) dividing the complex amplitude image of each of the plurality of light irradiation directions into a plurality of batches, correcting a phase of the complex amplitude image included in the batch based on the light irradiation direction for each of the plurality of batches, and then generating a complex amplitude summation image representing a summation of the complex amplitude images after correction, (b) generating a complex differential interference image of each of the plurality of batches based on the complex amplitude summation image of each of the plurality of batches, and (c) generating the two-dimensional phase image based on the complex differential interference image of each of the plurality of batches. Further, the two-dimensional phase image generation step may include (a) dividing the complex amplitude image of each of the plurality of light irradiation directions into the plurality of batches, correcting the phase of the complex amplitude image included in the batch based on the light irradiation direction for each of the plurality of batches, and then generating the complex amplitude summation image representing the summation of the complex amplitude images after correction, (b) generating the complex differential interference image of each of the plurality of batches based on the complex amplitude summation image of each of the plurality of batches for each of a plurality of shear directions on the image different from each other, and (c) generating the two-dimensional phase image based on the complex differential interference image of each of the plurality of shear directions and the plurality of batches.

Further, in one aspect, the observation method may further include (4) a second complex amplitude image generation step of generating, for each of the plurality of light irradiation directions, a complex amplitude image at each of a plurality of positions based on the complex amplitude image at the reference position generated in the first complex amplitude image generation step; (5) a three-dimensional phase image generation step of generating a three-dimensional phase image based on the two-dimensional phase image at each of the plurality of positions generated in the two-dimensional phase image generation step; and (6) a refractive index distribution calculation step of obtaining a three-dimensional refractive index distribution of the observation object based on the three-dimensional phase image.

The program of the above embodiment is a program for causing a computer to execute the steps of the above observation method. The recording medium of the above embodiment is a computer readable recording medium recording the above program.

INDUSTRIAL APPLICABILITY

The present invention can be used as an apparatus and a method capable of realizing three-dimensional refractive index tomography in which influence of multiple scattered light is reduced even when an observation object is a multiple scattering object.

REFERENCE SIGNS LIST 1A, 1B—observation apparatus, 2—recording medium, 11—light source, 12—lens, 13—light input end, 14—optical fiber, 15—fiber coupler, 16, 17—optical fiber, 18, 19—light output end, 21—lens, 22—mirror, 23—lens, 24—condenser lens, 25—objective lens, 31—lens, 32—mirror, 33—drive unit, 34—lens, 41—beam splitter, 42—lens, 43—imaging unit, 50—analysis unit, 51—interference intensity image acquisition unit, 52—first complex amplitude image generation unit, 53—second complex amplitude image generation unit, 54—two-dimensional phase image generation unit, 55—three-dimensional phase image generation unit, 56—refractive index distribution calculation unit, 57—display unit, 58—storage unit.

The invention claimed is:

1. An observation apparatus comprising:

a light source configured to output light;

an irradiation optical system including a mirror in which an orientation of a reflection surface is changeable, and configured to irradiate an observation object with the light from each of a plurality of light irradiation directions according to the orientation of the reflection surface of the mirror;

an imager configured to image an interference intensity image at a reference position generated by interference between the light irradiating the observation object along each of the plurality of light irradiation directions and passed through the observation object and reference light;

an imaging optical system including an objective lens and an imaging lens, and configured to set an image plane position having a conjugate relationship with respect to an imaging plane of the imager as the reference position for the observation object; and at least one processor configured to perform processes of:

an interference intensity image acquisition unit configured to acquire, for each of the plurality of light irradiation directions, the interference intensity image at the reference position from the imager;

a first complex amplitude image generation unit configured to generate a complex amplitude image at the reference position based on the interference intensity image at the reference position for each of the plurality of light irradiation directions; and a two-dimensional phase image generation unit configured to generate a two-dimensional phase image based on the complex amplitude image of each of the plurality of light irradiation directions, wherein the two-dimensional phase image generation unit is configured to:

generate a complex differential interference image of each of the plurality of light irradiation directions based on the complex amplitude image of each of the plurality of light irradiation directions, and generate the two-dimensional phase image based on a summation of the complex differential interference images of the plurality of light irradiation directions.

2. The observation apparatus according to claim 1, wherein the two-dimensional phase image generation unit is configured to:

generate the complex differential interference image of each of the plurality of light irradiation directions based on the complex amplitude image of each of the plurality of light irradiation directions for each of a plurality of shear directions on the image different from each other, and generate the two-dimensional phase image based on the complex differential interference image of each of the plurality of shear directions and the plurality of light irradiation directions.

3. The observation apparatus according to claim 1, wherein the at least one processor is configured to further perform processes of:

a second complex amplitude image generation unit configured to generate, for each of the plurality of light irradiation directions, a complex amplitude image at each of a plurality of positions based on the complex amplitude image at the reference position generated by the first complex amplitude image generation unit;

a three-dimensional phase image generation unit configured to generate a three-dimensional phase image based on the two-dimensional phase image at each of the plurality of positions generated by the two-dimensional phase image generation unit; and a refractive index distribution calculation unit configured to obtain a three-dimensional refractive index distribution of the observation object based on the three-dimensional phase image.

4. An observation method using:

a light source configured to output light;

an irradiation optical system including a mirror in which an orientation of a reflection surface is changeable, and configured to irradiate an observation object with the light from each of a plurality of light irradiation directions according to the orientation of the reflection surface of the mirror;

an imager configured to image an interference intensity image at a reference position generated by interference between the light irradiating the observation object along each of the plurality of light irradiation directions and passed through the observation object and reference light; and an imaging optical system including an objective lens and an imaging lens, and configured to set an image plane position having a conjugate relationship with respect to an imaging plane of the imager as the reference position for the observation object, the observation method comprising:

performing an interference intensity image acquisition of acquiring, for each of the plurality of light irradiation directions, the interference intensity image at the reference position from the imager;

performing a first complex amplitude image generation of generating a complex amplitude image at the reference position based on the interference intensity image at the reference position for each of the plurality of light irradiation directions; and performing a two-dimensional phase image generation of generating a two-dimensional phase image based on the complex amplitude image of each of the plurality of light irradiation directions, wherein the two-dimensional phase image generation includes:

generating a complex differential interference image of each of the plurality of light irradiation directions based on the complex amplitude image of each of the plurality of light irradiation directions, and generating the two-dimensional phase image based on a summation of the complex differential interference images of the plurality of light irradiation directions.

5. The observation method according to claim 4, wherein the two-dimensional phase image generation includes:

generating the complex differential interference image of each of the plurality of light irradiation directions based on the complex amplitude image of each of the plurality of light irradiation directions for each of a plurality of shear directions on the image different from each other, and generating the two-dimensional phase image based on the complex differential interference image of each of the plurality of shear directions and the plurality of light irradiation directions.

6. The observation method according to claim 4, further comprising:

performing a second complex amplitude image generation of generating, for each of the plurality of light irradiation directions, a complex amplitude image at each of a plurality of positions based on the complex amplitude image at the reference position generated in the first complex amplitude image generation;

performing a three-dimensional phase image generation of generating a three-dimensional phase image based on the two-dimensional phase image at each of the plurality of positions generated in the two-dimensional phase image generation; and performing a refractive index distribution calculation of obtaining a three-dimensional refractive index distribution of the observation object based on the three-dimensional phase image.

7. A program for causing a computer to execute the interference intensity image acquisition, the first complex amplitude image generation, and the two-dimensional phase image generation of the observation method according to claim 4.

8. A computer readable recording medium recording the program according to claim 7.

* * * * *